United States Patent
Krishnan et al.

(10) Patent No.: US 12,082,015 B2
(45) Date of Patent: Sep. 3, 2024

(54) DATA COLLECTION FOR NON-PUBLIC NETWORKS

(71) Applicant: QUALCOMM Incorporated, San Diego, CA (US)

(72) Inventors: Shankar Krishnan, San Diego, CA (US); Luis Fernando Brisson Lopes, Swindon (GB); Rajeev Kumar, San Diego, CA (US); Xipeng Zhu, San Diego, CA (US); Ozcan Ozturk, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 25 days.

(21) Appl. No.: 17/473,892

(22) Filed: Sep. 13, 2021

(65) Prior Publication Data

US 2023/0078374 A1    Mar. 16, 2023

(51) Int. Cl.
*H04W 24/08*    (2009.01)
*H04W 24/10*    (2009.01)
(Continued)

(52) U.S. Cl.
CPC ........... *H04W 24/08* (2013.01); *H04W 24/10* (2013.01); *H04W 36/0079* (2018.08); *H04W 36/08* (2013.01); *H04W 84/042* (2013.01)

(58) Field of Classification Search
CPC . H04W 24/08; H04W 24/10; H04W 74/0833; H04W 52/0225; H04W 4/021;
(Continued)

(56) References Cited

U.S. PATENT DOCUMENTS

| | | | | |
|---|---|---|---|---|
| 9,667,523 B2* | 5/2017 | Cho | ...................... | H04W 76/27 |
| 10,075,996 B2* | 9/2018 | Cho | ...................... | H04W 76/15 |

(Continued)

FOREIGN PATENT DOCUMENTS

| | | | | |
|---|---|---|---|---|
| CN | 113796023 A | * | 12/2021 | ............. H04B 7/063 |
| KR | 20200109341 A | * | 9/2020 | |

(Continued)

OTHER PUBLICATIONS

W. A. Hapsari, A. Umesh, M. Iwamura, M. Tomala, B. Gyula and B. Sebire, "Minimization of drive tests solution in 3GPP," in IEEE Communications Magazine, vol. 50, No. 6, pp. 28-36, Jun. 2012, doi: 10.1109/MCOM.2012.6211483. (Year: 2012).*

*Primary Examiner* — William D Cumming
(74) *Attorney, Agent, or Firm* — Polsinelli LLP; Paul M. McAdams

(57) ABSTRACT

Aspects present herein relate to methods and devices for wireless communication including an apparatus, e.g., a UE and/or a base station. The apparatus may receive, from a base station, a logged measurement configuration including a PLMN ID and a NID, the logged measurement configuration further including at least one of a trace reference, a logging area, a MDT PLMN list, or a MDT NPN list. The apparatus may also store the PLMN ID and the NID based on the received logged measurement configuration. Additionally, the apparatus may compare the PLMN ID and the NID to an MDT SNPN list to identify if the PLMN ID and the NID are included in the MDT SNPN list. The apparatus may also transmit, to the base station, an availability indicator if the PLMN ID and the NID are included in the MDT SNPN list.

30 Claims, 14 Drawing Sheets

(51) Int. Cl.
*H04W 36/00* (2009.01)
*H04W 36/08* (2009.01)
*H04W 84/04* (2009.01)

(58) Field of Classification Search
CPC ..... H04W 88/12; H04W 76/27; H04W 43/50; H04W 24/02; H04W 52/0229; H04W 48/16; H04W 52/367; H04W 76/15; H04W 36/18
USPC .................................. 370/252, 329; 455/423
See application file for complete search history.

(56) References Cited

U.S. PATENT DOCUMENTS

| | | | | |
|---|---|---|---|---|
| 11,290,899 | B2* | 3/2022 | Van Lieshout | H04L 43/08 |
| 11,581,915 | B2* | 2/2023 | Luo | H04W 52/0229 |
| 2013/0077517 | A1* | 3/2013 | Cho | H04L 43/50 |
| | | | | 370/252 |
| 2017/0311376 | A1* | 10/2017 | Cho | H04W 36/18 |
| 2020/0351696 | A1* | 11/2020 | Hong | H04W 48/08 |
| 2021/0345144 | A1* | 11/2021 | Yang | H04W 24/10 |
| 2022/0132332 | A1* | 4/2022 | Zhang | H04B 17/318 |
| 2022/0304066 | A1* | 9/2022 | Tripathi | H04W 52/367 |
| 2023/0057408 | A1* | 2/2023 | Ramachandra | H04W 24/10 |
| 2023/0078374 | A1* | 3/2023 | Krishnan | H04W 24/10 |
| | | | | 370/329 |
| 2023/0088189 | A1* | 3/2023 | Tseng | H04W 52/0225 |
| | | | | 370/252 |
| 2023/0117513 | A1* | 4/2023 | Kim | H04W 48/16 |
| | | | | 455/423 |

FOREIGN PATENT DOCUMENTS

| | | | | |
|---|---|---|---|---|
| WO | WO-2012148203 A2 * | 11/2012 | ............ | H04W 24/08 |
| WO | WO-2023059242 A1 * | 4/2023 | | |

* cited by examiner

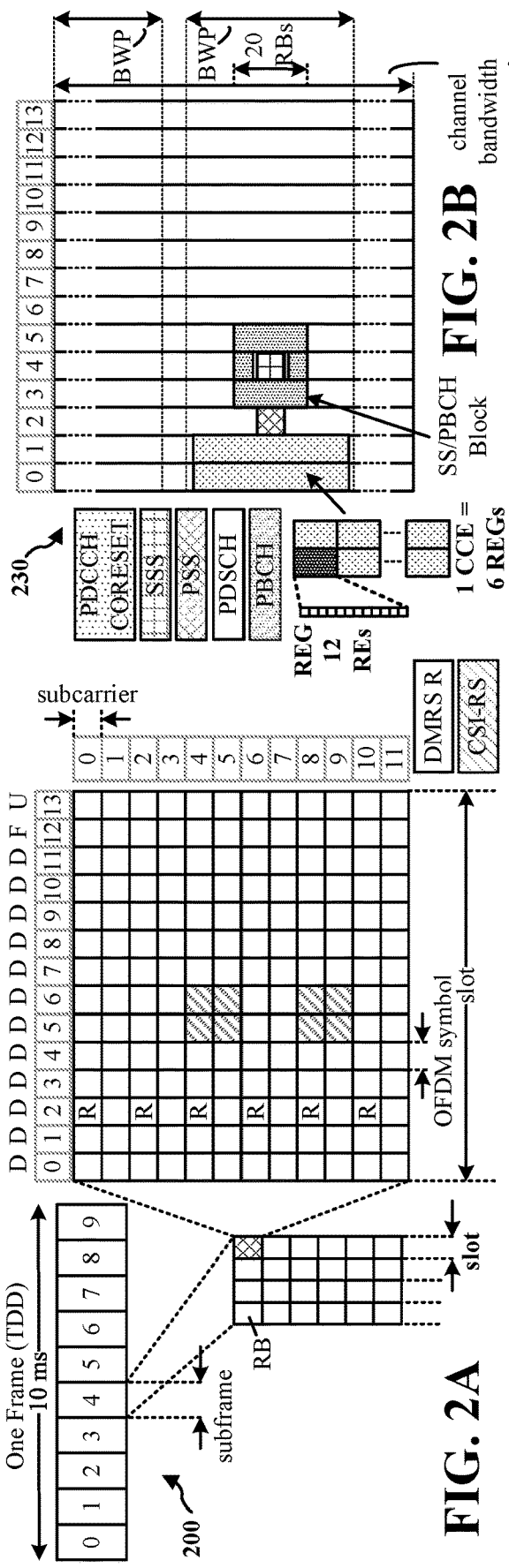
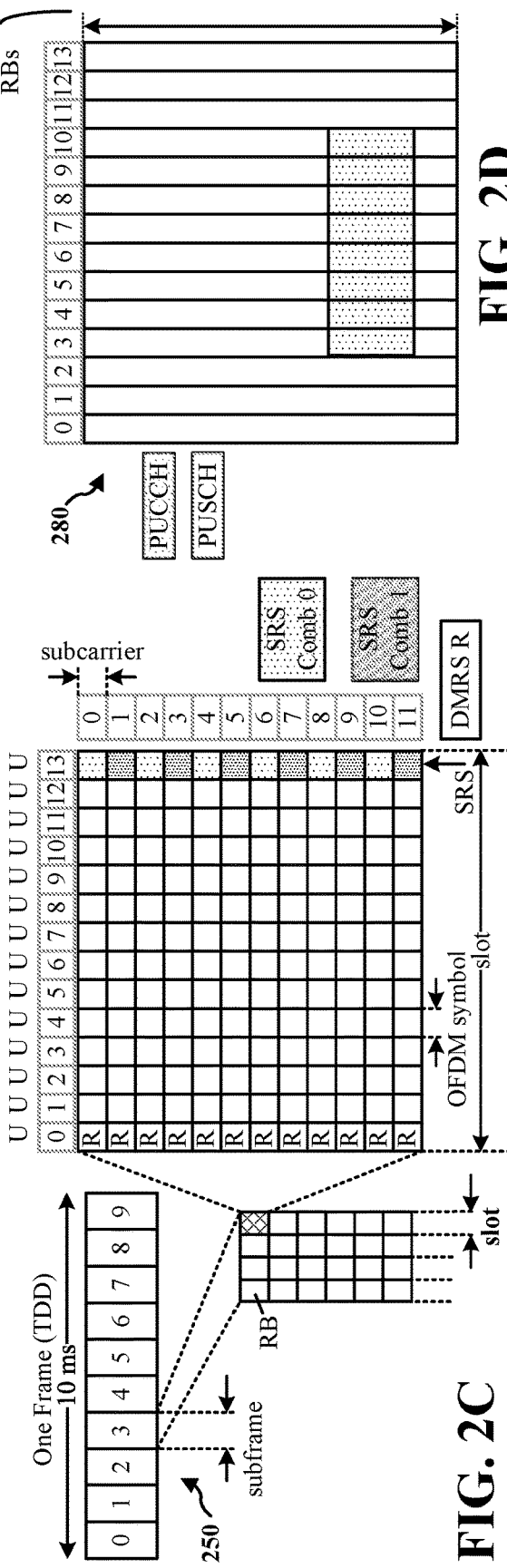

DATA COLLECTION FOR NON-PUBLIC NETWORKS

TECHNICAL FIELD

The present disclosure relates generally to communication systems, and more particularly, to data collection in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list. The apparatus may also store the PLMN ID and the NID based on the received logged measurement configuration. Additionally, the apparatus may compare the PLMN ID and the NID to an MDT standalone NPN (SNPN) list to identify if the PLMN ID and the NID are included in the MDT SNPN list. The apparatus may also transmit, to the base station, an availability indicator if the PLMN ID and the NID are included in the MDT SNPN list. Further, the apparatus may collect, from one or more UEs, mobility history information (MHI) including an NID for the MHI.

In another aspect of the disclosure, a method, a computer-readable medium, and an apparatus are provided. The apparatus may be a base station. The apparatus may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID). The apparatus may also select, based on the trace session activation request, at least one user equipment (UE) for data collection based on an availability of an MDT SNPN list information element (IE) at the at least one UE. The apparatus may also transmit, to the at least one UE, a logged measurement configuration including a PLMN ID and the NID, the logged measurement configuration further including at least one of the trace reference, a logging area, the MDT PLMN list, or an MDT NPN list. Moreover, the apparatus may receive, from the at least one UE, an availability indicator if the PLMN ID and the NID correspond to the MDT SNPN list. The apparatus may also collect, from one or more UEs, mobility history information (MHI) including an NID for the MHI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
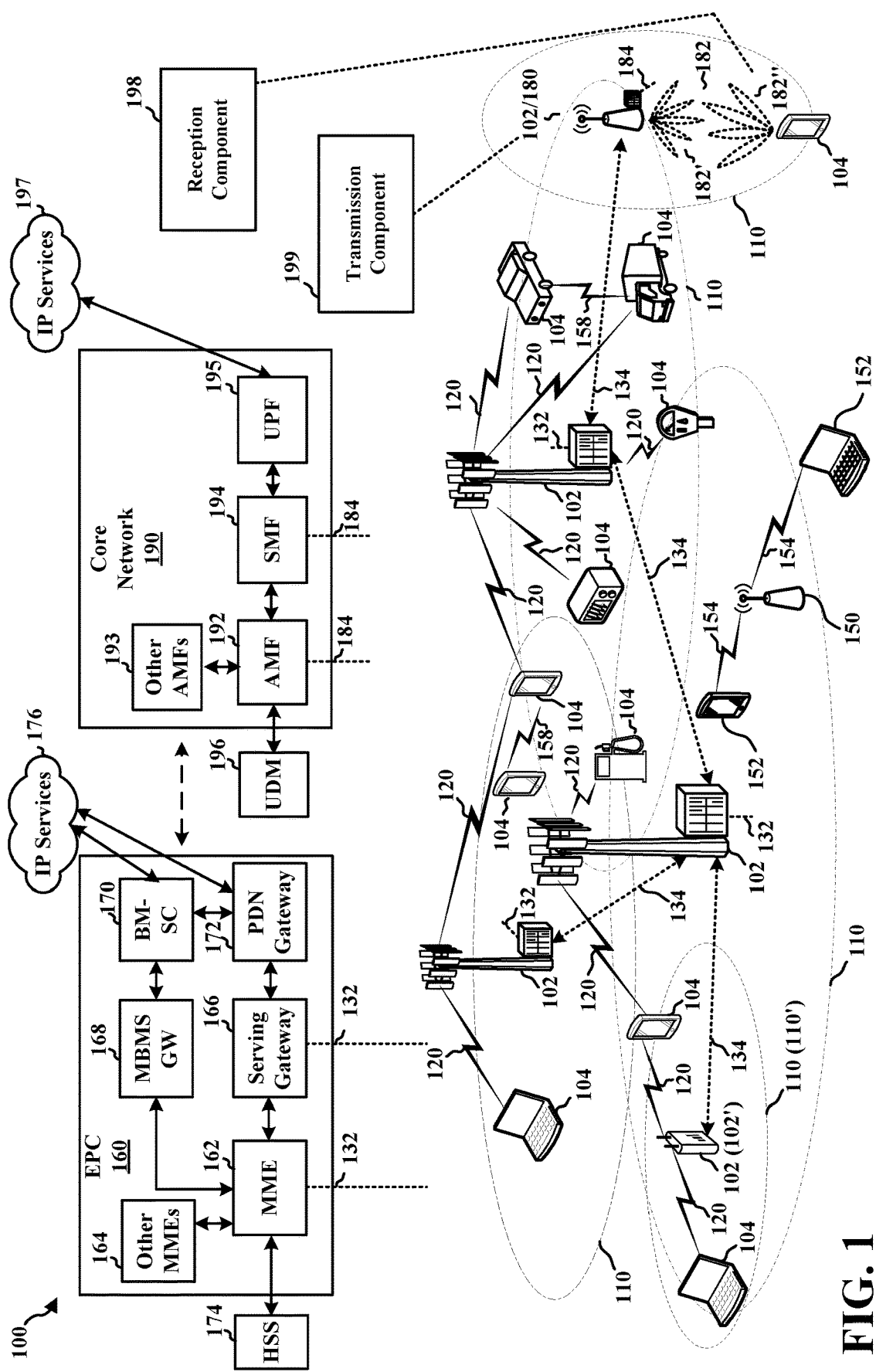
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list. Reception component 198 may also be configured to store the PLMN ID and the NID based on the received logged measurement configuration. Reception component 198 may also be configured to compare the PLMN ID and the NID to an MDT standalone NPN (SNPN) list to identify if the PLMN ID and the NID are included in the MDT SNPN list. Reception component 198 may also be configured to transmit, to the base station, an availability indicator if the PLMN ID and the NID are included in the MDT SNPN list. Reception component 198 may also be configured to collect, from one or more UEs, mobility history information (MHI) including an NID for the MHI.

Referring again to FIG. 1, in certain aspects, the base station 180 may include a transmission component 199 configured to receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID). Transmission component 199 may also be configured to select, based on the trace session activation request, at least one user equipment (UE) for data collection based on an availability of an MDT SNPN list information element (IE) at the at least one UE. Transmission component 199 may also be configured to transmit, to the at least one UE, a logged measurement configuration including a PLMN ID and the NID, the logged measurement configuration further including at least one of the trace reference, a logging area, the MDT PLMN list, or an MDT NPN list. Transmission component 199 may also be configured to receive, from the at least one UE, an availability indicator if the PLMN ID and the NID correspond to the MDT SNPN list. Transmission component 199 may also be configured to collect, from one or more UEs, mobility history information (MHI) including an NID for the MHI.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
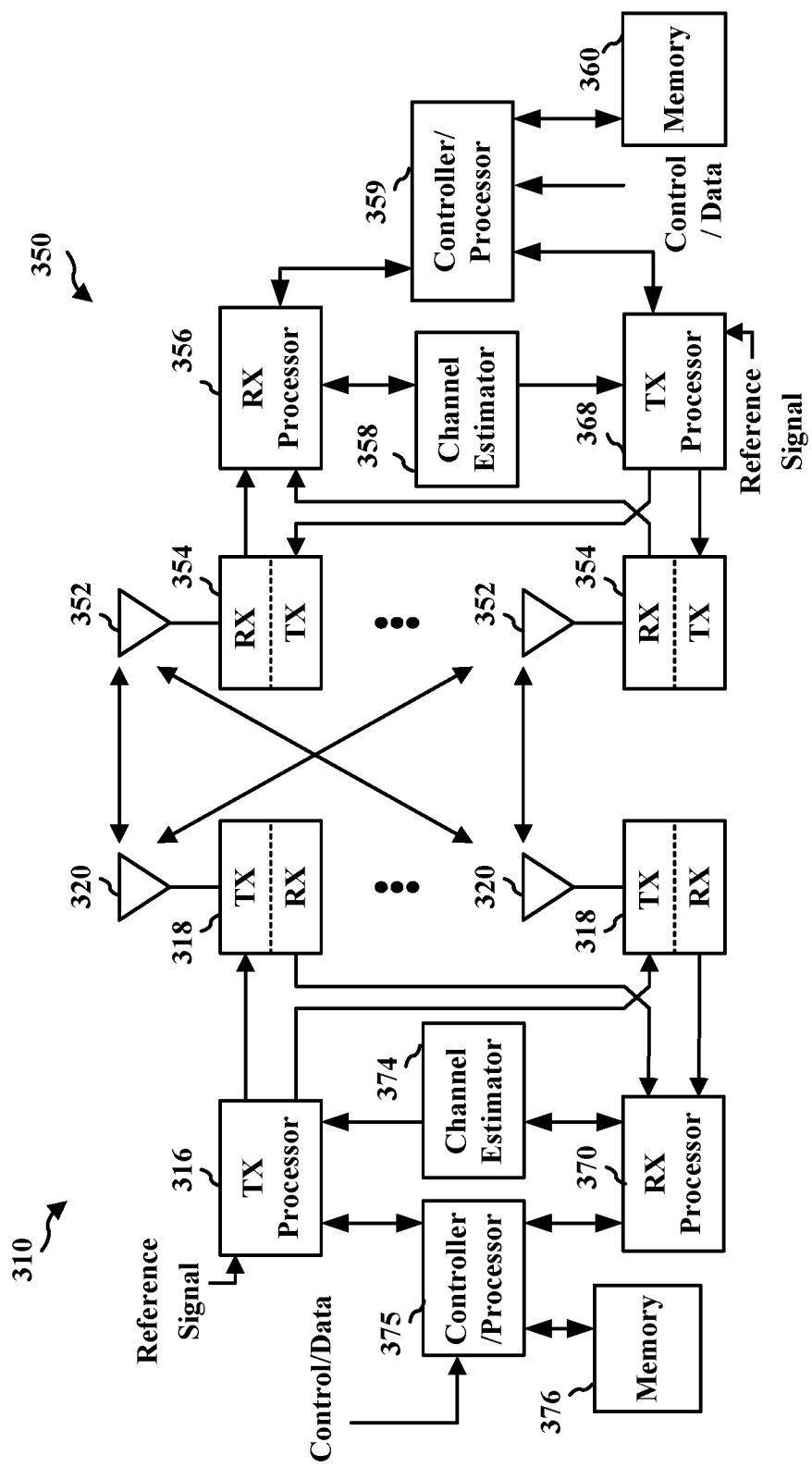
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communication may utilize a non-public network (NPN), i.e., a 5G system (5GS) deployed for non-public use. An NPN may be either a stand-alone non-public network (SNPN), i.e., operated by an NPN operator and not relying on network functions provided by a public land mobile network (PLMN), or a public network integrated NPN (PNI-NPN), i.e., a non-public network deployed with the support of a PLMN. The combination of a PLMN identifier (ID) and a network identifier (NID) may identify an SNPN. Also, the combination of a PLMN ID and a closed access group (CAG) ID may identify a PNI-NPN. In some aspects, an SNPN-enabled UE may support an SNPN access mode. For instance, if the UE is set to operate in SNPN access mode, the UE may select and register with SNPNs over the Uu interface (i.e., the interface between the UE and a universal mobile telecommunication system (UMTS) terrestrial radio access network (UTRAN)). Also, if the UE is not set to operate in SNPN access mode, even if it is SNPN-enabled, the UE may not select and register with SNPNs.

Figure 4:
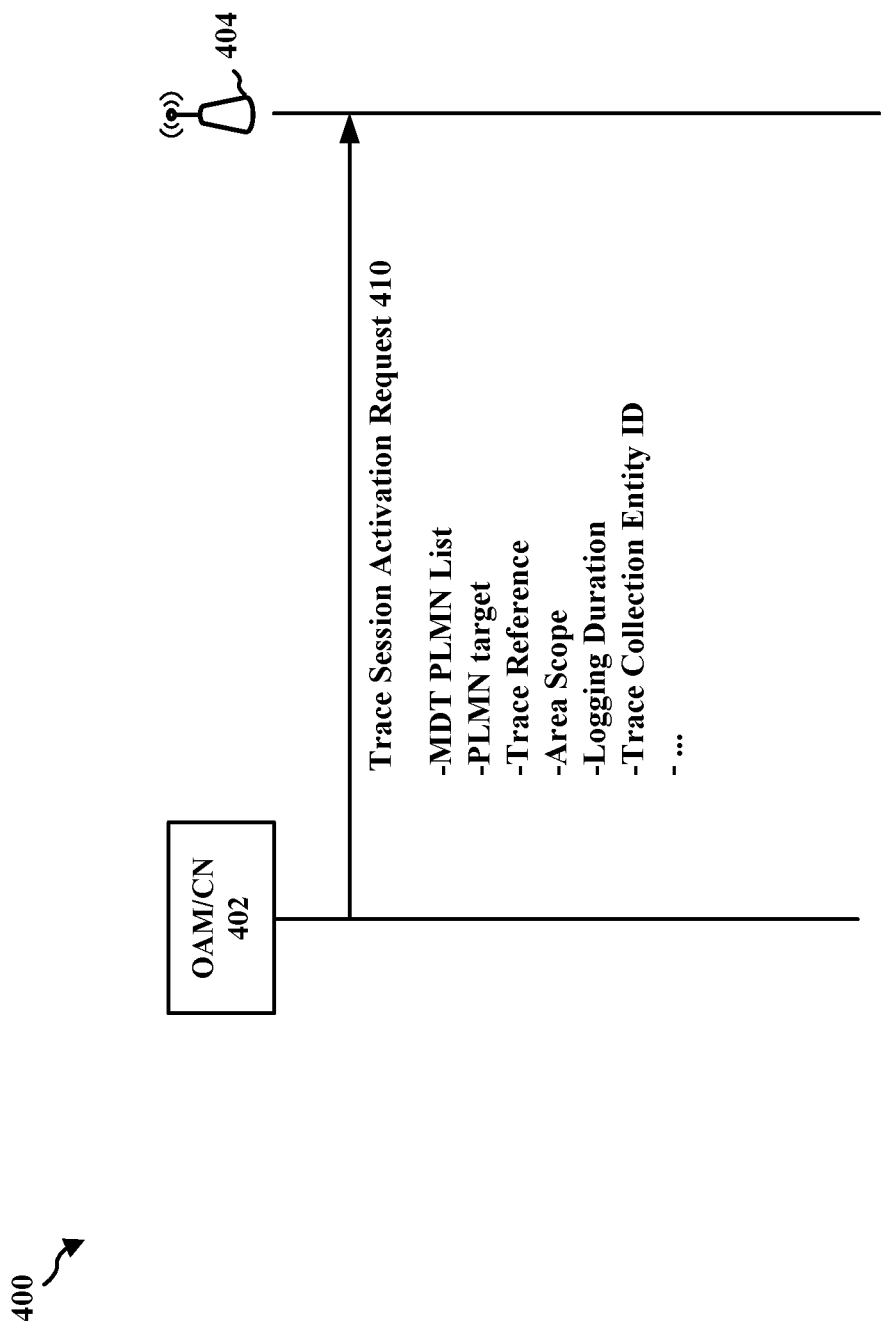
FIG. 4 is a diagram illustrating an example of communication between a network entity and a base station.

FIG. 4 illustrates a diagram 400 of one example of communication between a network entity 402, e.g., an operations, administration, and maintenance (OAM) or a core network (CN), and a base station 404. More specifically, diagram 400 is an example of minimization of drive tests (MDT) activation for non-NPNs between an OAM/CN 402 and a base station 404. As shown in FIG. 4, for MDT activation, the OAM/CN 402 may send a trace session activation request 410 to the base station 404. The trace session activation request 410 may include multiple parameters for configuring MDT measurements including: an MDT PLMN list, a PLMN target, a trace reference, an area scope, a logging duration, a trace collection entity ID, etc.

Some aspects of wireless communication, e.g., 5G NR, introduce a self-organizing network (SON)/MDT mechanism where data is collected from UEs in order to help optimize the network or system performance and procedures, such as random access channel (RACH) procedures and connection establishment. Additionally, UEs may report measurements collected in different RRC states along with location information to help the network build coverage maps and determine the root cause of network problems. This SON/MDT mechanism may apply to PLMN networks, i.e., networks managed by operators. As indicated above, certain aspects of wireless communication may introduce support for non-public networks (NPNs), where networks may be managed and deployed privately for closed and restricted access. However, these SON/MDT mechanisms may not support data collection from NPNs. Based on the above, it may be beneficial to enhance SON/MDT mechanisms to include NPNs. For instance, it may be beneficial to provide SON/MDT mechanisms that support data collection from NPNs.

Aspects of the present disclosure may allow for the enhancement of SON or MDT mechanisms that include NPNs. Further, aspects of the present disclosure may provide SON/MDT mechanisms that support data collection from NPNs. For instance, aspects of the present disclosure may include SON/MDT mechanisms that support data collection from NPNs to optimize system and network performance. Aspects of the present disclosure may enhance SON/MDT mechanisms for NPNs based on a number of different functions, such as: (i) MDT configuration for NPN-UE/base station behavior; (ii) cross-system SON/MDT reporting; (iii) mobility history information (MHI) enhancements; (iv) parallel handling of PLMN MDT and NPN MDT; (v) connection establishment failure (CEF) report enhancements; (vi) enhancements to failure indications and mobility settings changes; (vii) load balancing enhancements for NPN; and (viii) network collected measurements.

Figure 5:
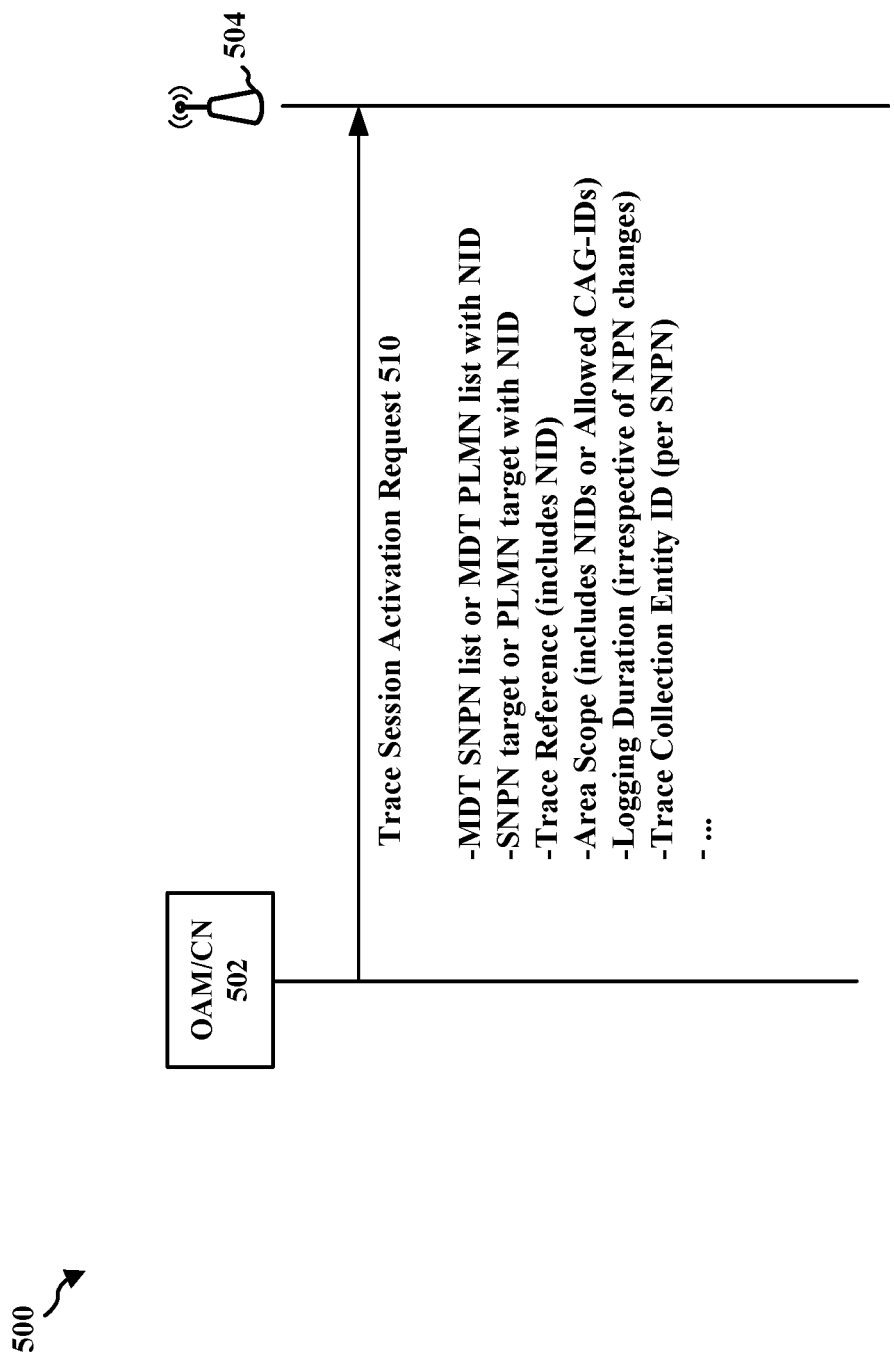
FIG. 5 is a diagram illustrating an example of communication between a network entity and a base station.

FIG. 5 illustrates a diagram 500 of one example of communication between a network entity 502, e.g., an operations, administration, and maintenance (OAM) or a core network (CN), and a base station 504. More specifically, diagram 500 is an example of minimization of drive tests (MDT) configuration for NPNs between an OAM/CN 502 and a base station 504. As shown in FIG. 5, for MDT configuration, the OAM/CN 502 may send a trace session activation request 510 to the base station 504. The trace session activation request 510 may include multiple parameters for configuring MDT measurements including: an MDT SNPN list or MDT PLMN list with an NID, SNPN target or PLMN target with an NID, a trace reference (including an NID), an area scope (including NIDs or allowed CAG-IDs), a logging duration (irrespective of NPN changes), and a trace collection entity ID (per SNPN).

As shown in FIG. 5, in some aspects of the present disclosure, an OAM/CN may indicate to a base station an MDT SNPN list or an MDT PLMN list with NIDs indicating to SNPNs where measurement collection, status indication, and/or log reporting is allowed. Also, an OAM/CN may indicate to a base station an SNPN target or PLMN target with NIDs to select trace sessions for MDT in case of management-based activation when several SNPNs are supported in the radio access network (RAN). An OAM/CN may also indicate to a base station an area scope that defines the area in terms of NIDs or CAG-IDs where the MDT data collection may occur.

In some instances, aspects of the present disclosure may enhance a trace reference to include an NID to provide a globally unique identifier to identify the trace collection entity (TCE) belonging to an SNPN. The trace reference may then be composed as: mobile country code (MCC)+ mobile network code (MNC)+Trace ID+NID. Aspects of the present disclosure may also allow for a logging duration to start at a time the UE receives a configuration and continue independent of registered SNPN changes or switching between CAG and non-CAG cells. Further, aspects of the present disclosure may include networks with a configured mapping of a TCE ID and the destination to which trace records may be transferred. In some instances, the mapping may be unique within the SNPN.

Aspects of the present disclosure may also include enhancements to base station behavior for NPN data collection. For instance, aspects of the present disclosure may include a UE selection by a base station (e.g., a gNB) during management-based MDT activation in SNPN. When the management based MDT activation is sent to the base station, the base station may check the availability of an MDT SNPN list IE before making the UE selection. In case the MDT SNPN list IE is not available, the base station may not select the UE. In case the MDT SNPN list IE is available, the base station may verify if the UE's registered SNPN matches the SNPN where the TCE resides. In case of a mismatch, the base station may not select the UE. Aspects of the present disclosure may also include MDT context handling during mobility in NPN. For instance, the base station may forward the received MDT configuration parameters for NPN to a target node during handover (e.g., a handover request) or to the new node where the UE resumes from an RRC inactive state (RRC_INACTIVE) using a retrieve UE context procedure (RETRIEVE UE CONTEXT RESPONSE).

Figure 6:
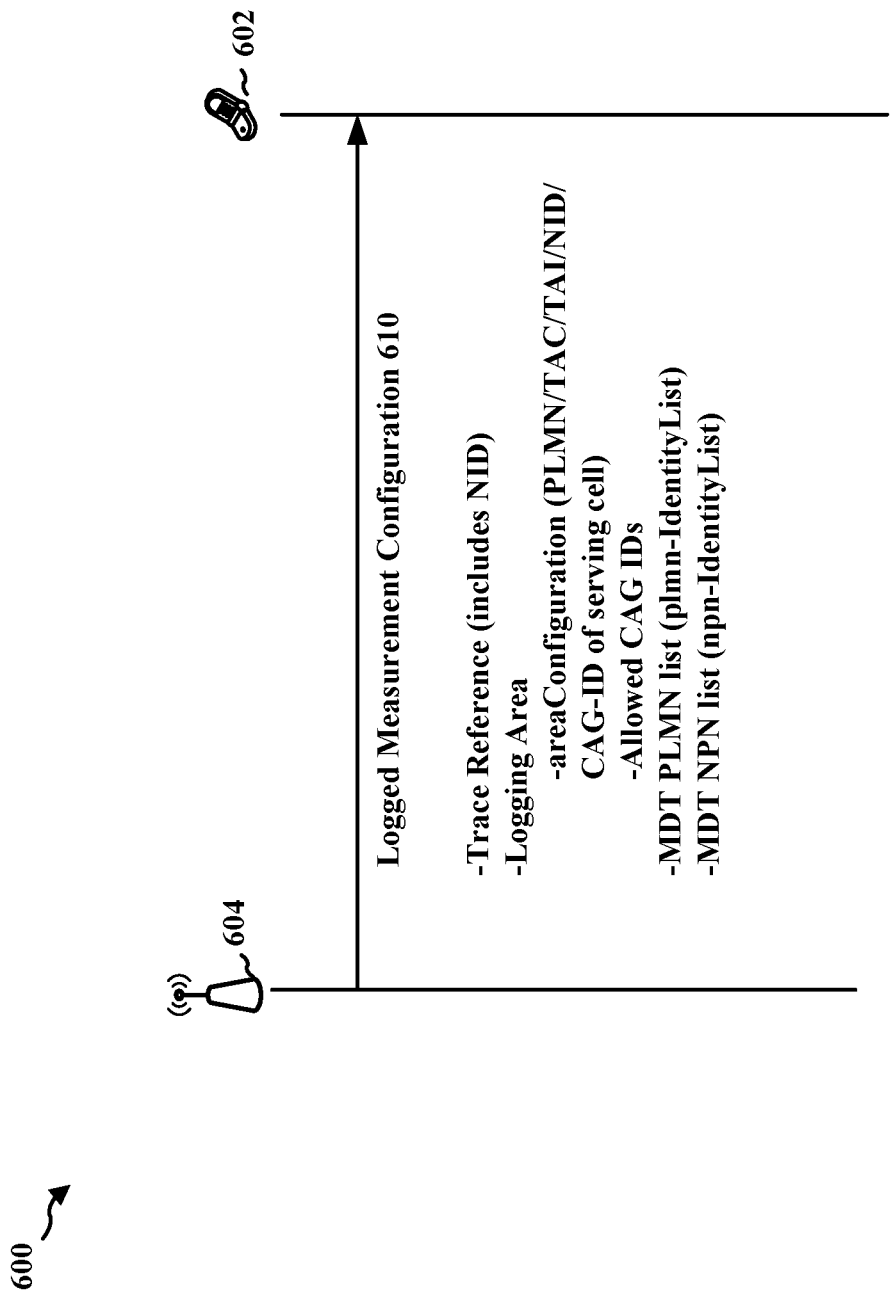
FIG. 6 is a diagram illustrating an example of communication between a UE and a base station.

FIG. 6 illustrates a diagram 600 of one example of communication between a UE 602 and a base station 604. More specifically, diagram 600 is an example of a logged measurement configuration enhancement for NPNs between UE 602 and base station 604. As shown in FIG. 6, the base station 604 may send a logged measurement configuration 610 to the UE 602. The logged measurement configuration 610 may include multiple parameters including: a trace reference (including an NID), a logging area including an area configuration (PLMN/tracking area code (TAC)/tracking area identity (TAI)/NID/CAG-ID of serving cell) and allowed CAG IDs, an MDT PLMN list (plmn-IdentityList), and/or an MDT NPN list (npn-IdentityList).

As shown in FIG. 6, in addition to an MDT PLMN list, base station 604 may configure UE 602 with an MDT SNPN list (npn-IdentityList) to indicate the list of NPNs where logged MDT can be performed. Base station 604 may enhance the existing logging area to also include cells broadcasted in an SNPN or a PNI-NPN by including MD or CAG-ID of a serving cell in the area configuration. Base station 604 may also include an NID along with the trace reference to have a globally unique identifier for the TCE specific to an SNPN.

In some aspects, a UE may store the registered PLMN (RPLMN) associated with the collected SON/MDT data (e.g., RLF report, CEF report, RACH report, mobility history report, logged MDT report, listen-before-talk (LBT) report, unified access control (UAC) report). A UE may also check the RPLMN before sending an availability indicator to the network for the stored SON/MDT data. Further, a UE may check the RPLMN before sending the stored SON/MDT data to the network or base station.

Aspects of the present disclosure may also include enhancements to UE behavior for SNPN data collection. For instance, a UE may store the registered SNPN (identified by PLMN ID and NID) with the collected SON/MDT data (e.g., RLF report, CEF report, RACH report, mobility history report, logged MDT report, LBT report, UAC report). The UE may check if the registered SNPN (identified by PLMN ID and NID) is part of an MDT SNPN list before sending an availability indicator to the SNPN for the stored SON/MDT data. Also, a UE may not indicate the availability of MDT measurements in an SNPN that is not in the MDT SNPN list. A UE may also check the registered SNPN (identified by PLMN ID and NID) before sending the stored SON/MDT data to the network.

In some instances, if no logging area is configured, logged MDT measurements may be performed as long as the registered SNPN is part of the MDT SNPN list. Also, when the UE is not in the logging area or the registered SNPN is not part of the MDT SNPN list, the logging may be suspended, i.e., the logged measurement configuration and the log may be kept but measurement results may not be logged. In case a new NPN that does not belong to the MDT SNPN list provides a logged measurement configuration, any previously configured logged measurement configuration and corresponding log may be cleared and overwritten without being retrieved. Aspects of the present disclosure may also introduce a new UE capability where MDT measurement collection and reporting is supported by UEs in SNPN or PNI-NPN.

Figure 7:
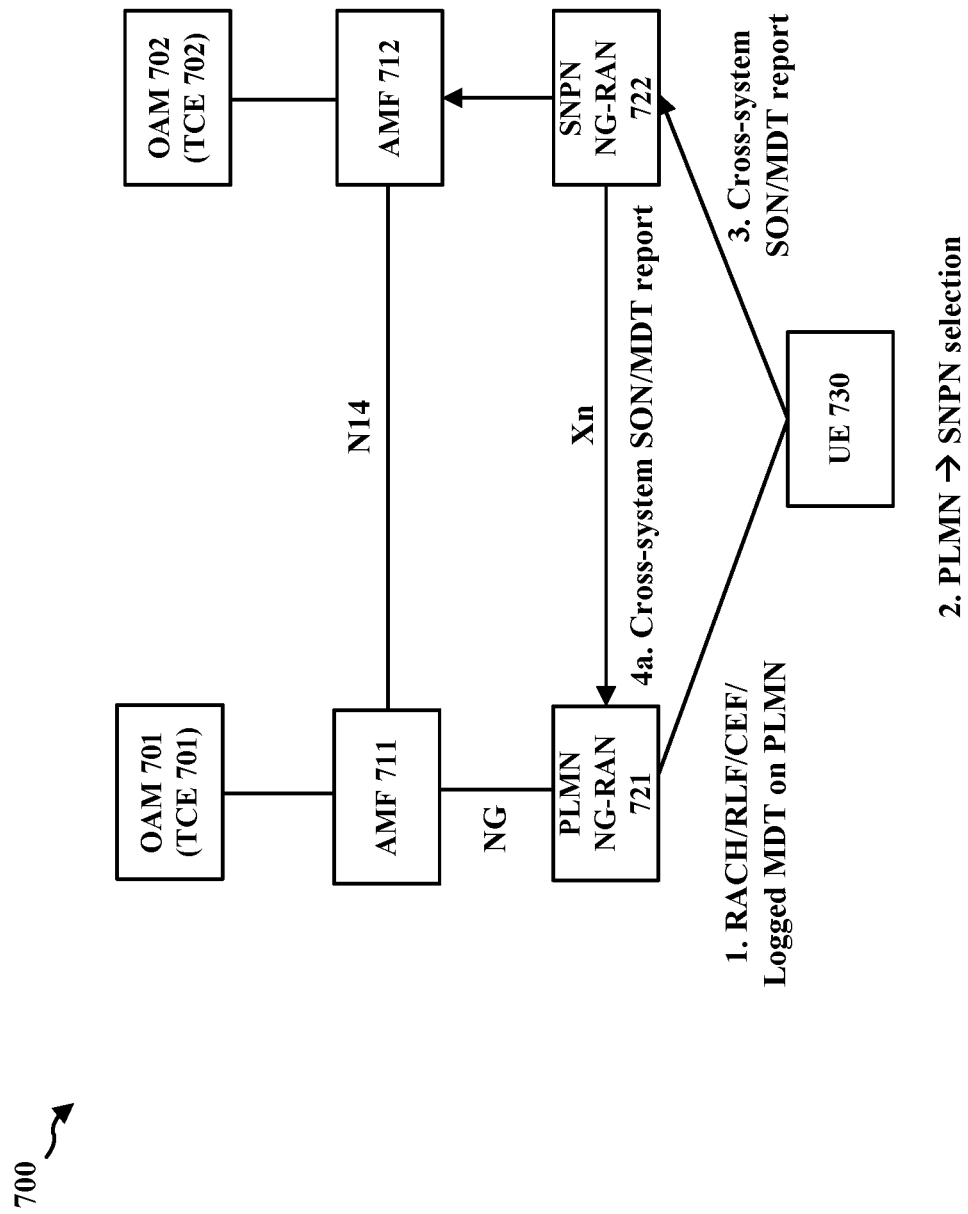
FIG. 7 is a diagram illustrating an example of reporting or communication with a network or system.

FIG. 7 illustrates a diagram 700 of one example of reporting or communication with a network or system. More specifically, diagram 700 is an example of cross-system SON/MDT reporting within a network including OAM/TCE 701, OAM/TCE 702, AMF 711, AMF 712, PLMN 721, SNPN 722, and UE 730. As shown in FIG. 7, there may be an N14 interface between AMF 711 and AMF 712 and an Xn interface between PLMN 721 and SNPN 722. As further shown in FIG. 7, there may be a RACH/RLF/CEF/logged MDT on PLMN 721. The UE 730 may include PLMN or SNPN selection and then transmit a cross-system SON/MDT report to SNPN 722. The SNPN 722 may then transmit a cross-system SON/MDT report to PLMN 721 and/or AMF 712. In some aspects, if there is an Xn interface between PLMN 721 and SNPN 722, or if there is an N14 interface between respective OAMs (OAM 701/702), or if there is a shared OAM, it may be useful to send a PLMN SON/MDT report to SNPN 722, and vice versa, instead of waiting for it to be retrieved until it attaches back to PLMN 721.

Aspects of the present disclosure may introduce a new UE capability for cross system SON/MDT reporting (i.e., whether a UE supports sending PLMN MDT reports to NPN and vice versa). In some instances, a UE may be configured with both an MDT PLMN list and an MDT SNPN list if the UE supports cross-system MDT reporting. For example, an MDT PLMN list=[PLMN X, PLMN Y] and an MDT SNPN list=[{PLMN A, NID (1,2)}, {PLMN B, NID (1,3)}]. A UE may also be configured with a logging area containing both cells belonging to a PLMN and an SNPN if the UE supports cross-system MDT reporting. In addition to a registered SNPN check, a UE may also check if it supports cross-system MDT reporting before sending a PLMN SON/MDT availability indicator and PLMN SON/MDT data to an SNPN, and vice versa.

Additionally, aspects of the present disclosure may include a number of mobility history information (MHI) enhancements. For UE-collected MHI, the IE VisitedCellInfoList may include the mobility history information of a maximum of 16 most recently visited cells or a time spent in any cell selection state and/or camped on any cell state in NR or E-UTRA. In some instances, the VisitedCellInfoList may contain the mobility history information of cells belonging to a PLMN (i.e., contains a PLMN ID, a cell ID, and a TAC). Aspects of the present disclosure may enhance a VisitedCelllnfoList to also include mobility history information of cells belonging to an SNPN (e.g., by including an NID or npn-Identity). Regarding network-collected MHI, a UE history information IE may contain information about cells by which a UE has been served in an active state prior to the target cell (i.e., contains information about a set of NR cells identified by an NR cell global ID (CGI) IE). In some instances, the UE history information IE may contain the mobility history information of cells belonging to a PLMN (i.e., NR CGI contains a PLMN ID and a cell ID). Aspects of the present disclosure may enhance a UE history information to also include mobility history information of cells belonging to an SNPN (e.g., by including NID).

Aspects of the present disclosure may also include parallel handling of PLMN MDT and NPN MDT. In some instances, there may be a number of limitations, such as a logged MDT report may contain logs until a maximum of 64 kB, a RACH report may contain a maximum of eight (8) RACH procedures, an RLF and CEF report may contain the latest failure instance, and reports may be stored for a maximum of 48 hours or until retrieved. SNPNs coverage and availability may be limited, so a UE may access multiple SNPNs (e.g., in a factory) either due to frequent handovers or cell reselection. Therefore, it may be important to have a mechanism to optimally store SON/MDT reports in an SNPN or prioritize PLMN MDT reports over SNPN MDT reports. Aspects of the present disclosure may extend RLF and CEF reports to contain at least two failure instances (e.g., one for PLMN and one for NPN). Aspects of the present disclosure may also define a maximum number of records (e.g., a latest of two RACH procedures) belonging to an NPN within the total number of records (for both PLMN and NPN). Further, aspects of the present disclosure may define a smaller duration (e.g., 3 hours) for the NPN MDT records to be retrieved. Aspects of the present disclosure may also allot a separate memory for storing NPN MDT reports, i.e., different UE variables for NPN and PLMN. Also, aspects of the present disclosure may define a prioritization mechanism (based on some events) for prioritizing PLMN MDT over NPN MDT, e.g., do not store NPN MDT during peak hours or overload, or if radio conditions are below a certain threshold, etc.

Aspects of the present disclosure may also include a number of CEF report enhancements. A UE may fail connection establishment/resume in a PNI-NPN in a number of cases. For instance, a UE may try accessing a CAG cell, but none of the CAG IDs supported by the CAG cell may be part of the UE's allowed CAG list. Also, a UE may attempt to access a non-CAG cell, but the UE may be allowed to access CAG cells according to the mobility restrictions. A CEF report may be stored upon a certain expiration, e.g., a T300 or T319 expiry, and not when connection establishment is aborted due to other reasons (e.g., an RRC reject or NAS reject). It may also be important to optimize an allowed CAG list and CAG-only indications to reduce the probability of CEF in a PNI-NPN. Also, an RRC reject message (RRCReject) may be received frequently in PNI-NPNs if mobility restrictions are not set properly by the AMF. Aspects of the present disclosure may introduce new conditions to store a CEF report, e.g., store a CEF report upon receiving RRCReject or NAS reject with NPN-specific cause codes.

Aspects of the present disclosure may also include enhancements to handover reports. In some instances, a handover report message may be sent on an Xn interface by a first next generation (NG) RAN (NG-RAN) node to a second NG-RAN node to report a handover failure event or other mobility problem and may include a number of parameters. For instance, the handover report message may include a handover (HO) report type including HO too early, HO to wrong cell, an inter-system ping-pong. The handover report message may also include a handover cause including a new cause for handover from a PLMN to an SNPN or vice versa. Further, the handover report message may include a source cell CGI including a PLMN ID and a cell ID of a source cell, which may optionally include NID(s) in case a source cell belongs to an SNPN. The handover report message may also include a target cell CGI including a PLMN ID and a cell ID of a target cell, which may optionally include NID(s) in case a target cell belongs to an SNPN. The handover report message may also include a re-establishment cell CGI including a PLMN ID and a cell ID of a re-established cell, which may optionally include NID(s) in case a re-establishment cell belongs to an SNPN. Further, the handover report message may include an indication that a UE performed initial/mobility registration due to handover between SNPNs or between an SNPN and a PLMN.

Moreover, aspects of the present disclosure may include a failure indication message and a mobility settings change procedure. A failure indication message may be sent by a second NG-RAN node (NG-RAN node2) to indicate an RRC re-establishment attempt or a reception of an RLF report from a UE that suffered a connection failure at a first NG-RAN node (NG-RAN node1). In case of RRC re-establishment initiated reporting without an RLF report, re-establishment cell CGI may be included in the failure indication message. Also, the failure indication message may include an NID to extend failure indication to SNPNs. A mobility settings change procedure may enable an NG-RAN node to negotiate the handover trigger settings with a peer NG-RAN node controlling neighboring cells. The PLMN and cell ID of the source cell and peer cell may be included in the messages. Also, an NID of the source and peer cell may be included to extend a mobility settings change procedure to SNPNs.

Aspects of the present disclosure may also include load balancing enhancements for NPN. For instance, aspects of the present disclosure may include a resource status request that is sent by a first NG-RAN node (NG-RAN node1) to a second NG-RAN node (NG-RAN node2) to initiate the requested load measurements according to the parameters provided in the message and may include the CGI of the cell to which the request applies. Also, the resource status request may include an NID in case the requested cell belongs to an SNPN. Aspects of the present disclosure may also include a resource status update, i.e., a message sent by the NG-RAN node2 to the NG-RAN node1 to report the results of the requested load measurements for the requested cells, which may be identified by the CGI of the cell. The resource status update may include: an NID in case the requested cell belongs to an SNPN, an indicator for whether the requested cell has onboarding indication being broadcasted, and/or an indicator for whether it is a CAG cell or not. For reporting a slice available capacity, a broadcast PLMN may be included along with the single-network slice selection assistance information (S-NSSAI) IDs for which the load is measured. For SNPN, a broadcast SNPN may be included.

Further, aspects of the present disclosure may include network-collected measurements. In some instances, an NG-RAN/core network (CN)/OAM may collect a number of statistics on NPN for further optimizations. For example, an NG-RAN/CN/OAM may collect: a number of times an AMF rejected a NAS request due to mobility restrictions; a number of times an NG-RAN rejects an RRC resume request from a UE due to mobility restrictions; a time period to go from RRC_IDLE to RRC_CONNECTED in an SNPN or a PNI-NPN, a time period to go from RRC_INACTIVE to RRC_CONNECTED in an SNPN or a PNI-NPN; a number of times a UE may need an emergency protocol data unit (PDU) session and camps on a CAG cell and none of the CAG-IDs of the CAG cell are included in the allowed CAG list for the current PLMN in the UE's subscription; a number of times a UE may need an emergency PDU session and camps on a non-CAG cell in a PLMN for which the UE's subscription contains an indication that the UE is allowed to access a 5G system (5GS) via CAG cells; and/or an interruption time when switching between an NPN and a PLMN.

Figure 8:
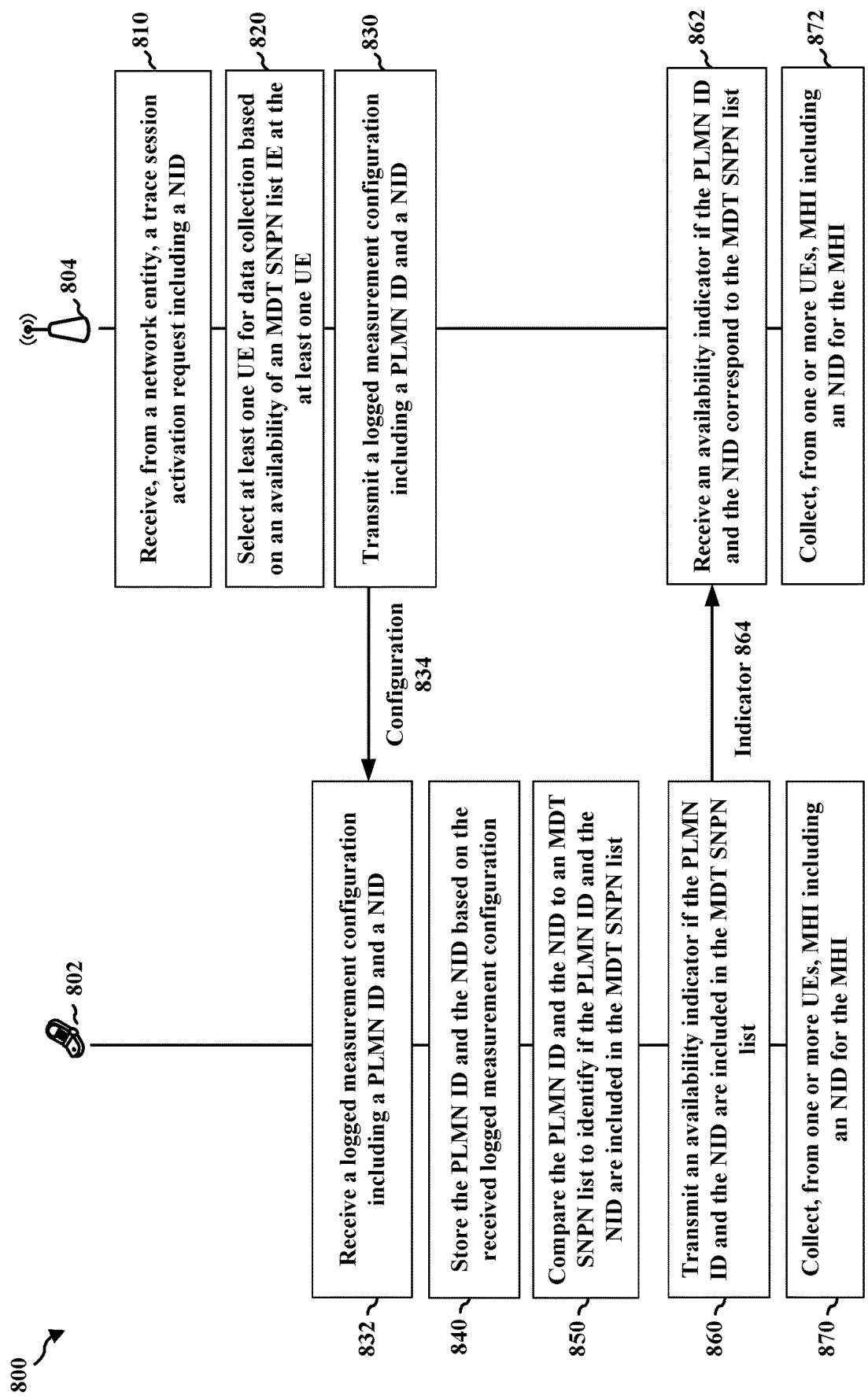
FIG. 8 is a diagram illustrating example communication between a UE and a base station.

FIG. 8 is a diagram 800 illustrating example communication between a UE 802 and a base station 804.

At 810, base station 804 may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID).

At 820, base station 804 may select, based on the trace session activation request, at least one user equipment (UE) for data collection based on an availability of an MDT SNPN list information element (IE) at the at least one UE.

At 830, base station 804 may transmit, to the at least one UE, a logged measurement configuration including a PLMN ID and the NID, e.g., configuration 834, the logged measurement configuration further including at least one of the trace reference, a logging area, the MDT PLMN list, or an MDT NPN list.

At 832, UE 802 may receive, from a base station, a logged measurement configuration including a public land mobile network (PLMN) identifier (ID) and a network identifier (NID), e.g., configuration 834, the logged measurement configuration further including at least one of a trace reference, a logging area, a minimization of drive tests (MDT) PLMN list, or a MDT non-public network (NPN) list.

In some aspects, the NID may be included in the trace reference based on an identification of a trace collection entity (TCE) for an SNPN. The TCE for the SNPN may be associated with a configured mapping that is unique to the SNPN. Also, a logging duration may start when the logged measurement configuration is received by the UE, and the logging duration may be independent of registered SNPN changes or switching between closed access group (CAG) cells and non-CAG cells. Additionally, the UE may be selected for data collection based on an availability of an MDT SNPN list information element (IE) at the UE. The data collection may be associated with one or more MDT reports or one or more self-organizing network (SON) reports. Further, if the logging area is not configured, one or more logged MDT measurements may be performed if a registered SNPN is part of the MDT SNPN list.

At 840, UE 802 may store the PLMN ID and the NID based on the received logged measurement configuration.

At 850, UE 802 may compare the PLMN ID and the NID to an MDT standalone NPN (SNPN) list to identify if the PLMN ID and the NID are included in the MDT SNPN list.

At 860, UE 802 may transmit, to the base station, an availability indicator if the PLMN ID and the NID are included in the MDT SNPN list, e.g., indicator 864. The availability indicator may be a PLMN MDT availability indicator associated with PLMN MDT data or a PLMN SON availability indicator associated with PLMN SON data. The UE may support cross-system MDT reporting or cross-system self-organizing network (SON) reporting.

At 862, base station 804 may receive, from the at least one UE, an availability indicator if the PLMN ID and the NID correspond to the MDT SNPN list, e.g., indicator 864.

At 870, UE 802 may collect, from one or more UEs, mobility history information (MHI) including an NID for the MHI. In some instances, the availability indicator may include the MHI including the NID for the MHI.

At 872, base station 804 may collect, from one or more UEs, mobility history information (MHI) including an NID for the MHI.

In some instances, PLMN MDT data may be processed in parallel with NPN MDT data, or one or more PLMN MDT reports may be processed in parallel with one or more NPN MDT reports. Also, a connection establishment failure (CEF) report may be stored at the UE upon reception of a radio resource control (RRC) rejection message. Moreover, the NID may be included in at least one of: a handover report, a failure indication, a resource status request, or a resource status update.

Figure 9:
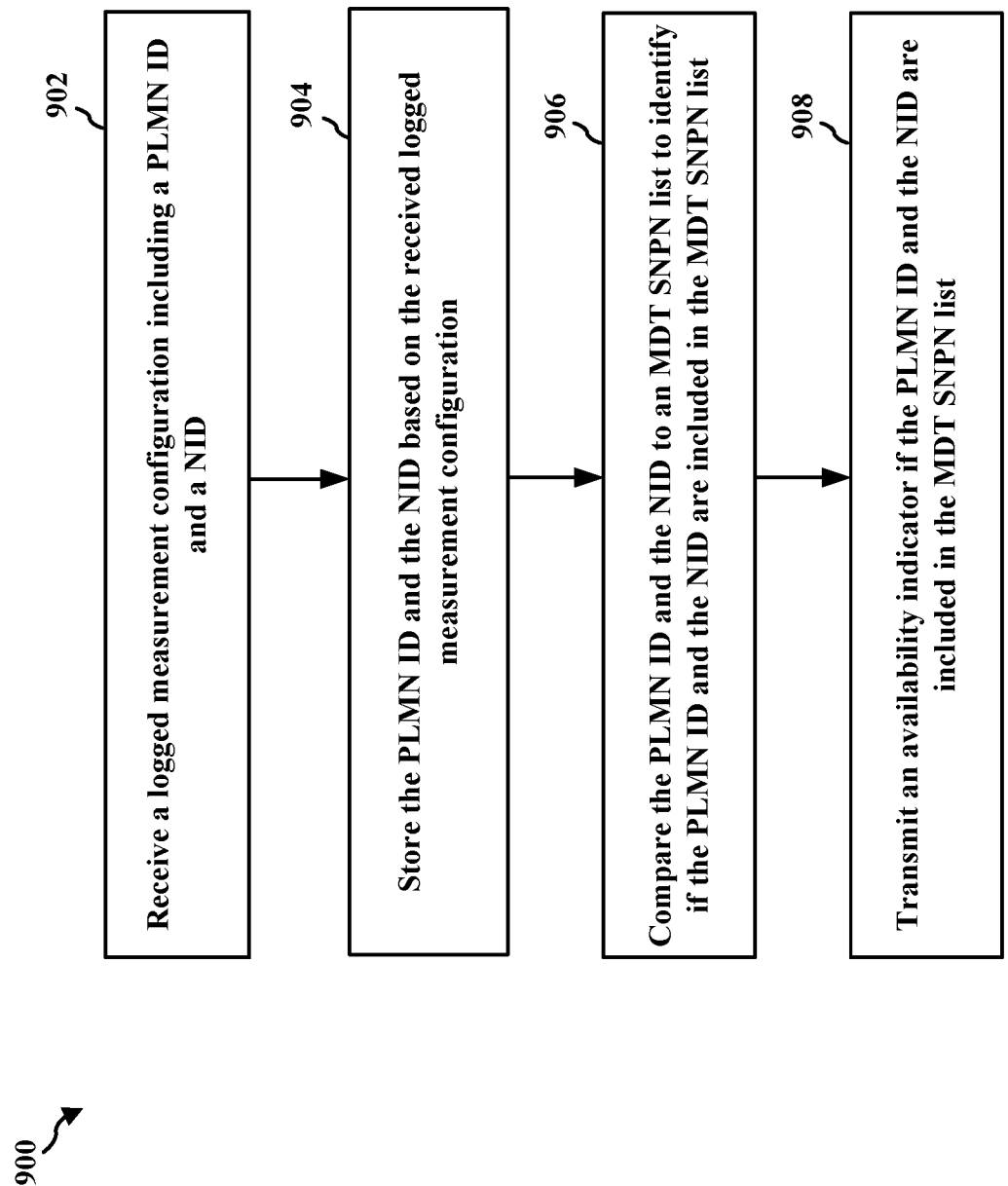
FIG. 9 is a flowchart of a method of wireless communication.

FIG. 9 is a flowchart 900 of a method of wireless communication. The method may be performed by a UE or a component of a UE (e.g., the UE 104, 350, 602, 730, 802; the apparatus 1302). The methods described herein may provide a number of benefits, such as improving communication signaling, resource utilization, and/or power savings.

At 902, the UE may receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list, as described in connection with the examples in FIGS. 4-8. For example, UE 802 may receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list, as described in connection with 832 in FIG. 8. Further, 902 may be performed by determination component 1340 in FIG. 13.

In some aspects, the NID may be included in the trace reference based on an identification of a trace collection entity (TCE) for an SNPN. The TCE for the SNPN may be associated with a configured mapping that is unique to the SNPN. Also, a logging duration may start when the logged measurement configuration is received by the UE, and the logging duration may be independent of registered SNPN changes or switching between closed access group (CAG) cells and non-CAG cells. Additionally, the UE may be selected for data collection based on an availability of an MDT SNPN list information element (IE) at the UE. The data collection may be associated with one or more MDT reports or one or more self-organizing network (SON) reports. Further, if the logging area is not configured, one or more logged MDT measurements may be performed if a registered SNPN is part of the MDT SNPN list.

At 904, the UE may store the PLMN ID and the NID based on the received logged measurement configuration, as described in connection with the examples in FIGS. 4-8. For example, UE 802 may store the PLMN ID and the NID based on the received logged measurement configuration, as described in connection with 840 in FIG. 8. Further, 904 may be performed by determination component 1340 in FIG. 13.

At 906, the UE may compare the PLMN ID and the NID to an MDT standalone NPN (SNPN) list to identify if the PLMN ID and the NID are included in the MDT SNPN list, as described in connection with the examples in FIGS. 4-8. For example, UE 802 may compare the PLMN ID and the NID to an MDT standalone NPN (SNPN) list to identify if the PLMN ID and the NID are included in the MDT SNPN list, as described in connection with 850 in FIG. 8. Further, 906 may be performed by determination component 1340 in FIG. 13.

At 908, the UE may transmit, to the base station, an availability indicator if the PLMN ID and the NID are included in the MDT SNPN list, as described in connection with the examples in FIGS. 4-8. For example, UE 802 may transmit, to the base station, an availability indicator if the PLMN ID and the NID are included in the MDT SNPN list, as described in connection with 860 in FIG. 8. Further, 908 may be performed by determination component 1340 in FIG. 13. The availability indicator may be a PLMN MDT availability indicator associated with PLMN MDT data or a PLMN SON availability indicator associated with PLMN SON data. The UE may support cross-system MDT reporting or cross-system self-organizing network (SON) reporting.

In some instances, PLMN MDT data may be processed in parallel with NPN MDT data, or one or more PLMN MDT reports may be processed in parallel with one or more NPN MDT reports. Also, a connection establishment failure (CEF) report may be stored at the UE upon reception of a radio resource control (RRC) rejection message. Moreover, the NID may be included in at least one of: a handover report, a failure indication, a resource status request, or a resource status update.

Figure 10:
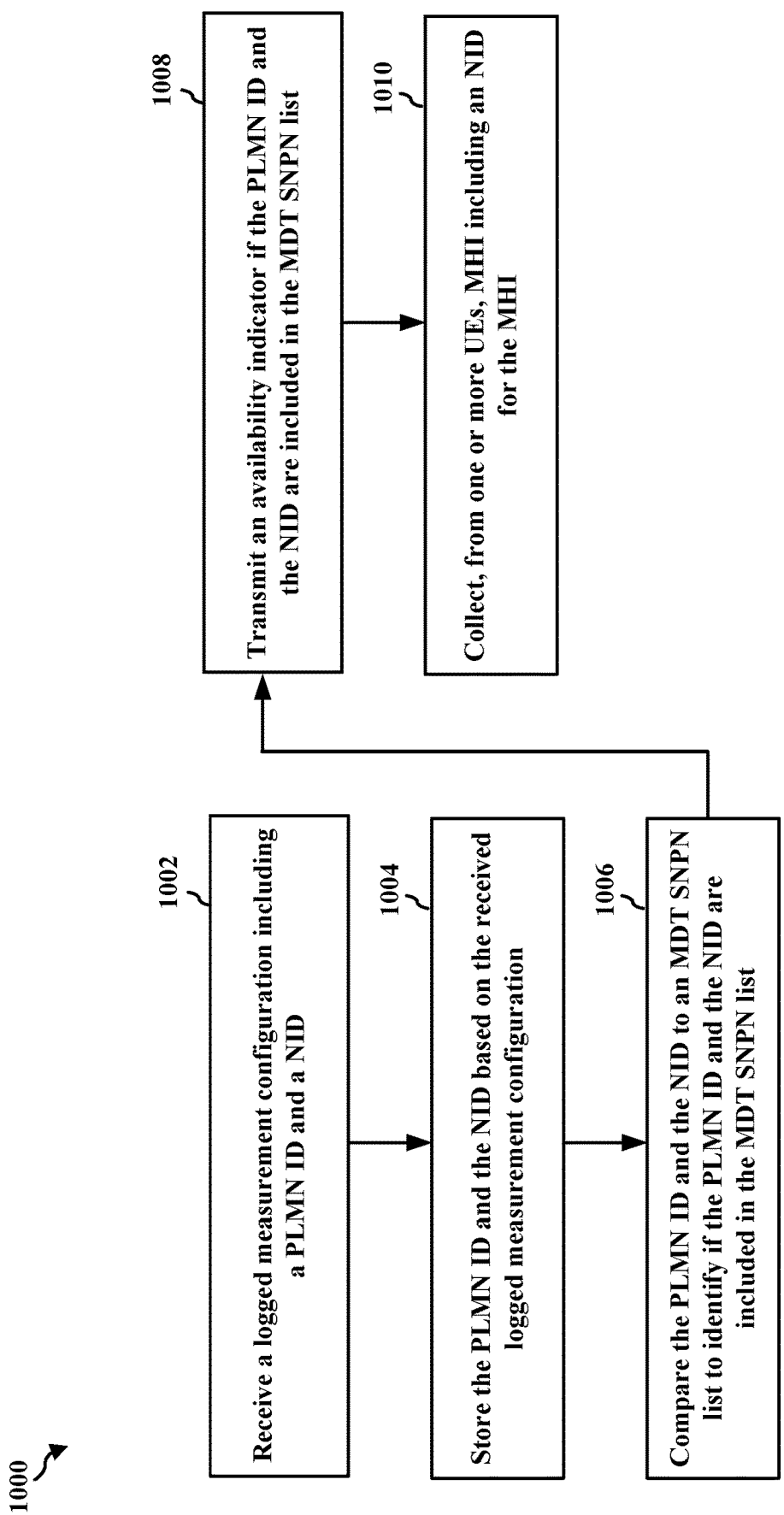
FIG. 10 is a flowchart of a method of wireless communication.

FIG. 10 is a flowchart 1000 of a method of wireless communication. The method may be performed by a UE or a component of a UE (e.g., the UE 104, 350, 602, 730, 802; the apparatus 1302). The methods described herein may provide a number of benefits, such as improving communication signaling, resource utilization, and/or power savings.

At 1002, the UE may receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list, as described in connection with the examples in FIGS. 4-8. For example, UE 802 may receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list, as described in connection with 832 in FIG. 8. Further, 1002 may be performed by determination component 1340 in FIG. 13.

In some aspects, the NID may be included in the trace reference based on an identification of a trace collection entity (TCE) for an SNPN. The TCE for the SNPN may be associated with a configured mapping that is unique to the SNPN. Also, a logging duration may start when the logged measurement configuration is received by the UE, and the logging duration may be independent of registered SNPN changes or switching between closed access group (CAG) cells and non-CAG cells. Additionally, the UE may be selected for data collection based on an availability of an MDT SNPN list information element (IE) at the UE. The data collection may be associated with one or more MDT reports or one or more self-organizing network (SON) reports. Further, if the logging area is not configured, one or more logged MDT measurements may be performed if a registered SNPN is part of the MDT SNPN list.

At 1004, the UE may store the PLMN ID and the NID based on the received logged measurement configuration, as described in connection with the examples in FIGS. 4-8. For example, UE 802 may store the PLMN ID and the NID based on the received logged measurement configuration, as described in connection with 840 in FIG. 8. Further, 1004 may be performed by determination component 1340 in FIG. 13.

At 1006, the UE may compare the PLMN ID and the NID to an MDT standalone NPN (SNPN) list to identify if the PLMN ID and the NID are included in the MDT SNPN list, as described in connection with the examples in FIGS. 4-8. For example, UE 802 may compare the PLMN ID and the NID to an MDT standalone NPN (SNPN) list to identify if the PLMN ID and the NID are included in the MDT SNPN list, as described in connection with 850 in FIG. 8. Further, 1006 may be performed by determination component 1340 in FIG. 13.

At 1008, the UE may transmit, to the base station, an availability indicator if the PLMN ID and the NID are included in the MDT SNPN list, as described in connection with the examples in FIGS. 4-8. For example, UE 802 may transmit, to the base station, an availability indicator if the PLMN ID and the NID are included in the MDT SNPN list, as described in connection with 860 in FIG. 8. Further, 1008 may be performed by determination component 1340 in FIG. 13. The availability indicator may be a PLMN MDT availability indicator associated with PLMN MDT data or a PLMN SON availability indicator associated with PLMN SON data. The UE may support cross-system MDT reporting or cross-system self-organizing network (SON) reporting.

At 1010, the UE may collect, from one or more UEs, mobility history information (MHI) including an NID for the MHI, as described in connection with the examples in FIGS. 4-8. For example, UE 802 may collect, from one or more UEs, mobility history information (MHI) including an NID for the MHI, as described in connection with 870 in FIG. 8. Further, 1010 may be performed by determination component 1340 in FIG. 13. In some instances, the availability indicator may include the MHI including the NID for the MHI.

In some instances, PLMN MDT data may be processed in parallel with NPN MDT data, or one or more PLMN MDT reports may be processed in parallel with one or more NPN MDT reports. Also, a connection establishment failure (CEF) report may be stored at the UE upon reception of a radio resource control (RRC) rejection message. Moreover, the NID may be included in at least one of: a handover report, a failure indication, a resource status request, or a resource status update.

Figure 11:
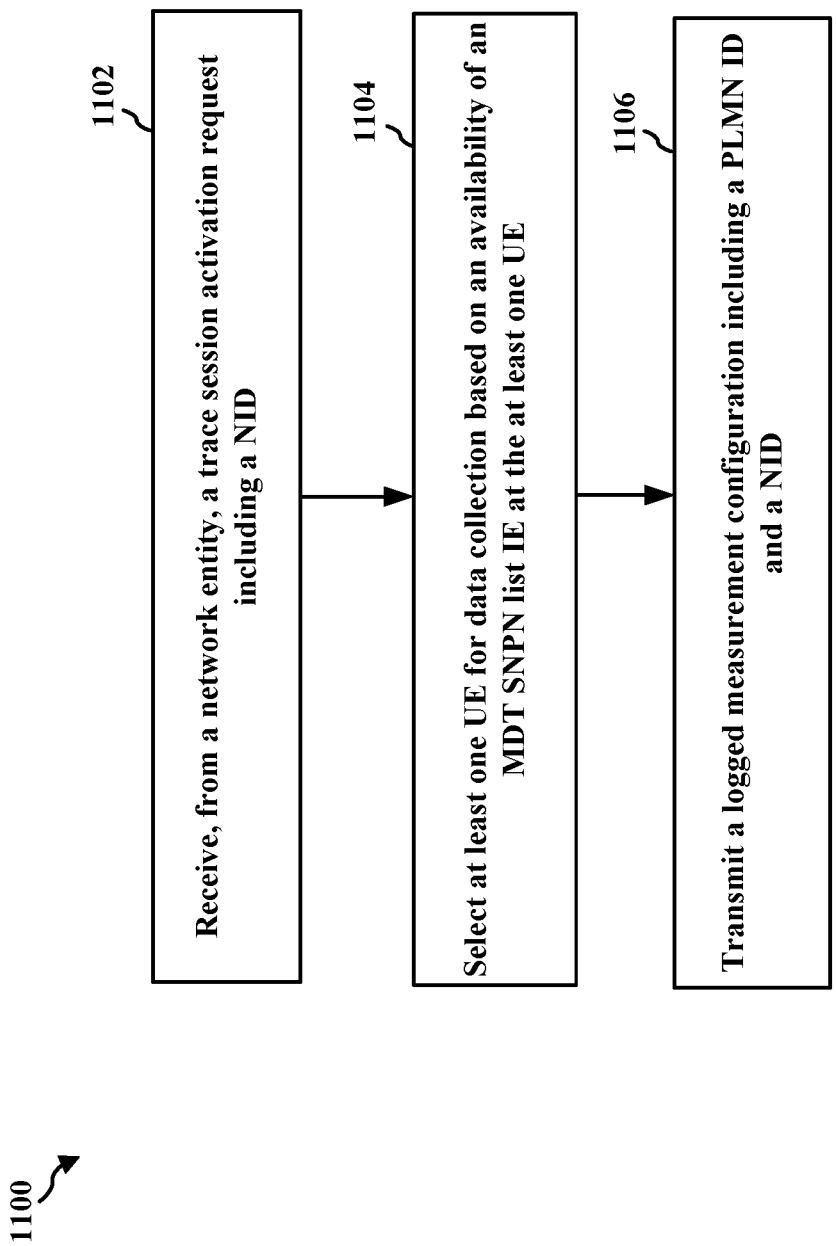
FIG. 11 is a flowchart of a method of wireless communication.

FIG. 11 is a flowchart 1100 of a method of wireless communication. The method may be performed by a base station or a component of a base station (e.g., the base station 102, 180, 310, 404, 504, 604, 804; the apparatus 1402). The methods described herein may provide a number of benefits, such as improving communication signaling, resource utilization, and/or power savings.

At 1102, the base station may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID), as described in connection with the examples in FIGS. 4-8. For example, base station 804 may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID), as described in connection with 810 in FIG. 8. Further, 1102 may be performed by determination component 1440 in FIG. 14.

At 1104, the base station may select, based on the trace session activation request, at least one user equipment (UE) for data collection based on an availability of an MDT SNPN list information element (IE) at the at least one UE, as described in connection with the examples in FIGS. 4-8. For example, base station 804 may select, based on the trace session activation request, at least one user equipment (UE) for data collection based on an availability of an MDT SNPN list information element (IE) at the at least one UE, as described in connection with 820 in FIG. 8. Further, 1104 may be performed by determination component 1440 in FIG. 14.

At 1106, the base station may transmit, to the at least one UE, a logged measurement configuration including a PLMN ID and the NID, the logged measurement configuration further including at least one of the trace reference, a logging area, the MDT PLMN list, or an MDT NPN list, as described in connection with the examples in FIGS. 4-8. For example, base station 804 may transmit, to the at least one UE, a logged measurement configuration including a PLMN ID and the NID, the logged measurement configuration further including at least one of the trace reference, a logging area, the MDT PLMN list, or an MDT NPN list, as described in connection with 830 in FIG. 8. Further, 1106 may be performed by determination component 1440 in FIG. 14.

In some aspects, the NID may be included in the trace reference based on an identification of a trace collection entity (TCE) for an SNPN. The TCE for the SNPN may be associated with a configured mapping that is unique to the SNPN. Also, the logging duration may start when the logged measurement configuration is received by the at least one UE, and the logging duration may be independent of registered SNPN changes or switching between closed access group (CAG) cells and non-CAG cells. The data collection may be associated with one or more MDT reports or one or more self-organizing network (SON) reports. Further, if the logging area is not configured, one or more logged MDT measurements may be performed if a registered SNPN is part of the MDT SNPN list.

An availability indicator from the at least one UE may include the MHI including the NID for the MHI. In some instances, PLMN MDT data may be processed in parallel with NPN MDT data, or one or more PLMN MDT reports may be processed in parallel with one or more NPN MDT reports. Also, a connection establishment failure (CEF) report may be based on a reception of a radio resource control (RRC) rejection message. Moreover, the NID may be included in at least one of: a handover report, a failure indication, a resource status request, or a resource status update. The availability indicator may be a PLMN MDT availability indicator associated with PLMN MDT data or a PLMN SON availability indicator associated with PLMN SON data. The at least one UE may support cross-system MDT reporting or cross-system self-organizing network (SON) reporting.

Figure 12:
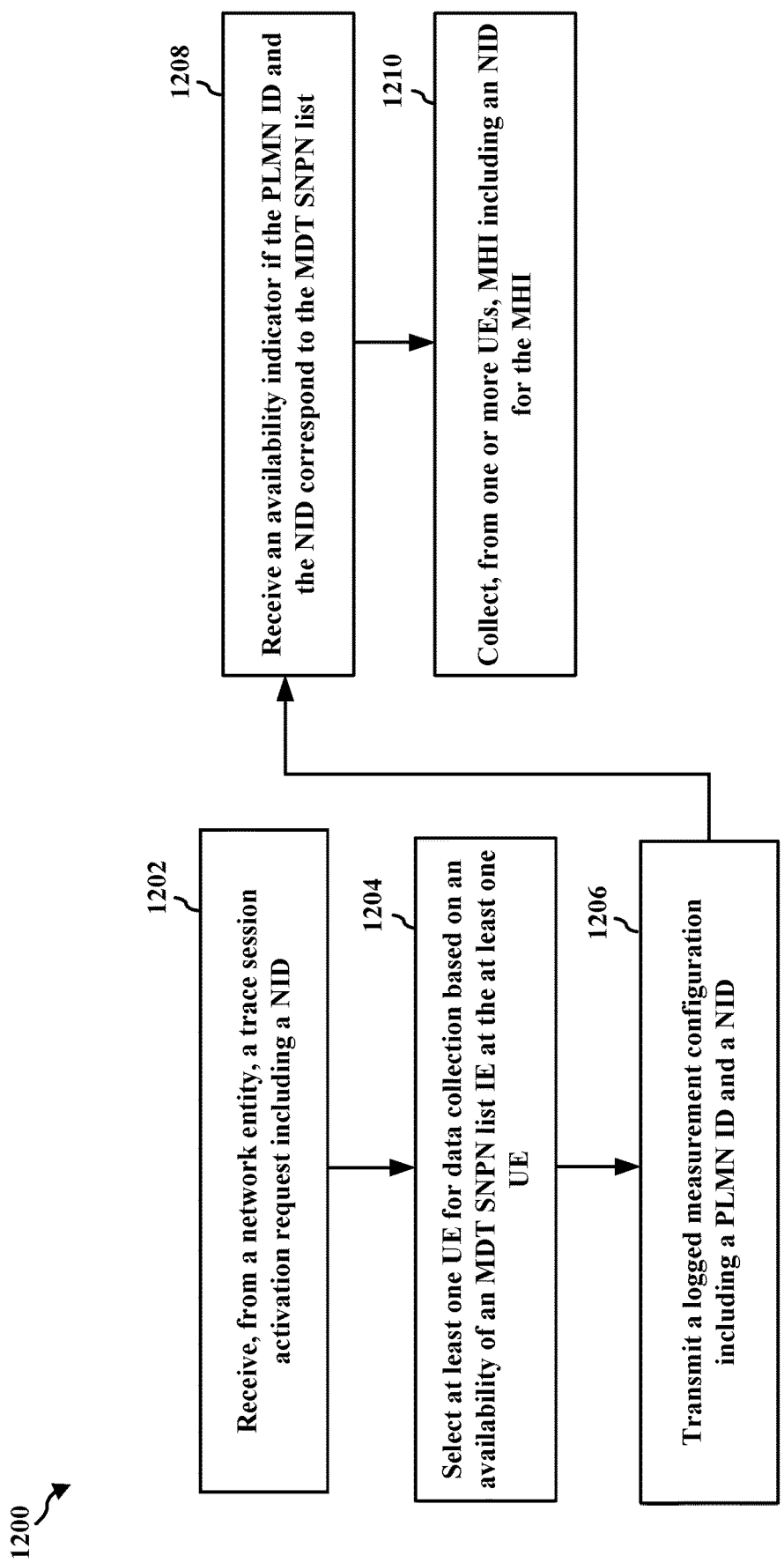
FIG. 12 is a flowchart of a method of wireless communication.

FIG. 12 is a flowchart 1200 of a method of wireless communication. The method may be performed by a base station or a component of a base station (e.g., the base station 102, 180, 310, 404, 504, 604, 804; the apparatus 1402). The methods described herein may provide a number of benefits, such as improving communication signaling, resource utilization, and/or power savings.

At 1202, the base station may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID), as described in connection with the examples in FIGS. 4-8. For example, base station 804 may receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID), as described in connection with 810 in FIG. 8. Further, 1202 may be performed by determination component 1440 in FIG. 14.

At 1204, the base station may select, based on the trace session activation request, at least one user equipment (UE) for data collection based on an availability of an MDT SNPN list information element (IE) at the at least one UE, as described in connection with the examples in FIGS. 4-8. For example, base station 804 may select, based on the trace session activation request, at least one user equipment (UE) for data collection based on an availability of an MDT SNPN list information element (IE) at the at least one UE, as described in connection with 820 in FIG. 8. Further, 1204 may be performed by determination component 1440 in FIG. 14.

At 1206, the base station may transmit, to the at least one UE, a logged measurement configuration including a PLMN ID and the NID, the logged measurement configuration further including at least one of the trace reference, a logging area, the MDT PLMN list, or an MDT NPN list, as described in connection with the examples in FIGS. 4-8. For example, base station 804 may transmit, to the at least one UE, a logged measurement configuration including a PLMN ID and the NID, the logged measurement configuration further including at least one of the trace reference, a logging area, the MDT PLMN list, or an MDT NPN list, as described in connection with 830 in FIG. 8. Further, 1206 may be performed by determination component 1440 in FIG. 14.

In some aspects, the NID may be included in the trace reference based on an identification of a trace collection entity (TCE) for an SNPN. The TCE for the SNPN may be associated with a configured mapping that is unique to the SNPN. Also, the logging duration may start when the logged measurement configuration is received by the at least one UE, and the logging duration may be independent of registered SNPN changes or switching between closed access group (CAG) cells and non-CAG cells. The data collection may be associated with one or more MDT reports or one or more self-organizing network (SON) reports. Further, if the logging area is not configured, one or more logged MDT measurements may be performed if a registered SNPN is part of the MDT SNPN list.

At 1208, the base station may receive, from the at least one UE, an availability indicator if the PLMN ID and the NID correspond to the MDT SNPN list, as described in connection with the examples in FIGS. 4-8. For example, base station 804 may receive, from the at least one UE, an availability indicator if the PLMN ID and the NID correspond to the MDT SNPN list, as described in connection with 862 in FIG. 8. Further, 1208 may be performed by determination component 1440 in FIG. 14. The availability indicator may be a PLMN MDT availability indicator associated with PLMN MDT data or a PLMN SON availability indicator associated with PLMN SON data. The at least one UE may support cross-system MDT reporting or cross-system self-organizing network (SON) reporting.

At 1210, the base station may collect, from one or more UEs, mobility history information (MHI) including an NID for the MHI, as described in connection with the examples in FIGS. 4-8. For example, base station 804 may collect, from one or more UEs, mobility history information (MHI) including an NID for the MHI, as described in connection with 872 in FIG. 8. Further, 1210 may be performed by determination component 1440 in FIG. 14. An availability indicator from the at least one UE may include the MHI including the NID for the MHI. In some instances, PLMN MDT data may be processed in parallel with NPN MDT data, or one or more PLMN MDT reports may be processed in parallel with one or more NPN MDT reports. Also, a connection establishment failure (CEF) report may be based on a reception of a radio resource control (RRC) rejection message. Moreover, the NID may be included in at least one of: a handover report, a failure indication, a resource status request, or a resource status update.

Figure 13:
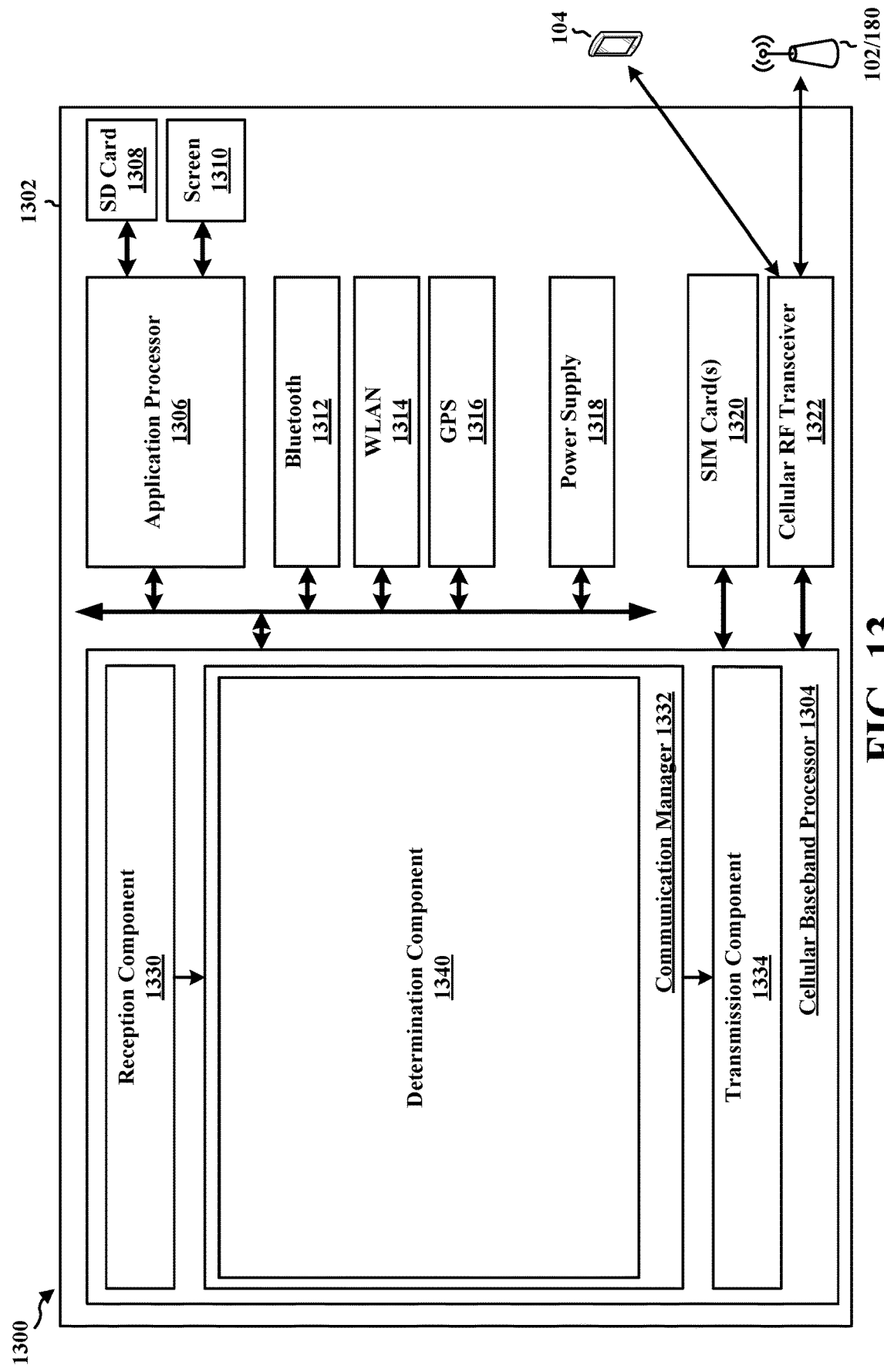
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a determination component 1340 that is configured to receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list, e.g., as described in connection with step 1002 above. Determination component 1340 may also be configured to store the PLMN ID and the NID based on the received logged measurement configuration, e.g., as described in connection with step 1004 above. Determination component 1340 may also be configured to compare the PLMN ID and the NID to an MDT standalone NPN (SNPN) list to identify if the PLMN ID and the NID are included in the MDT SNPN list, e.g., as described in connection with step 1006 above. Determination component 1340 may also be configured to transmit, to the base station, an availability indicator if the PLMN ID and the NID are included in the MDT SNPN list, e.g., as described in connection with step 1008 above. Determination component 1340 may also be configured to collect, from one or more UEs, mobility history information (MHI) including an NID for the MHI, e.g., as described in connection with step 1010 above.

The apparatus may include additional components that perform each of the blocks of the algorithm in the flowcharts of FIGS. 8-10. As such, each block in the flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list; means for storing the PLMN ID and the NID based on the received logged measurement configuration; means for comparing the PLMN ID and the NID to an MDT standalone NPN (SNPN) list to identify if the PLMN ID and the NID are included in the MDT SNPN list; means for transmitting, to the base station, an availability indicator if the PLMN ID and the NID are included in the MDT SNPN list; and means for collecting, from one or more UEs, mobility history information (MHI) including an NID for the MHI. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 14:
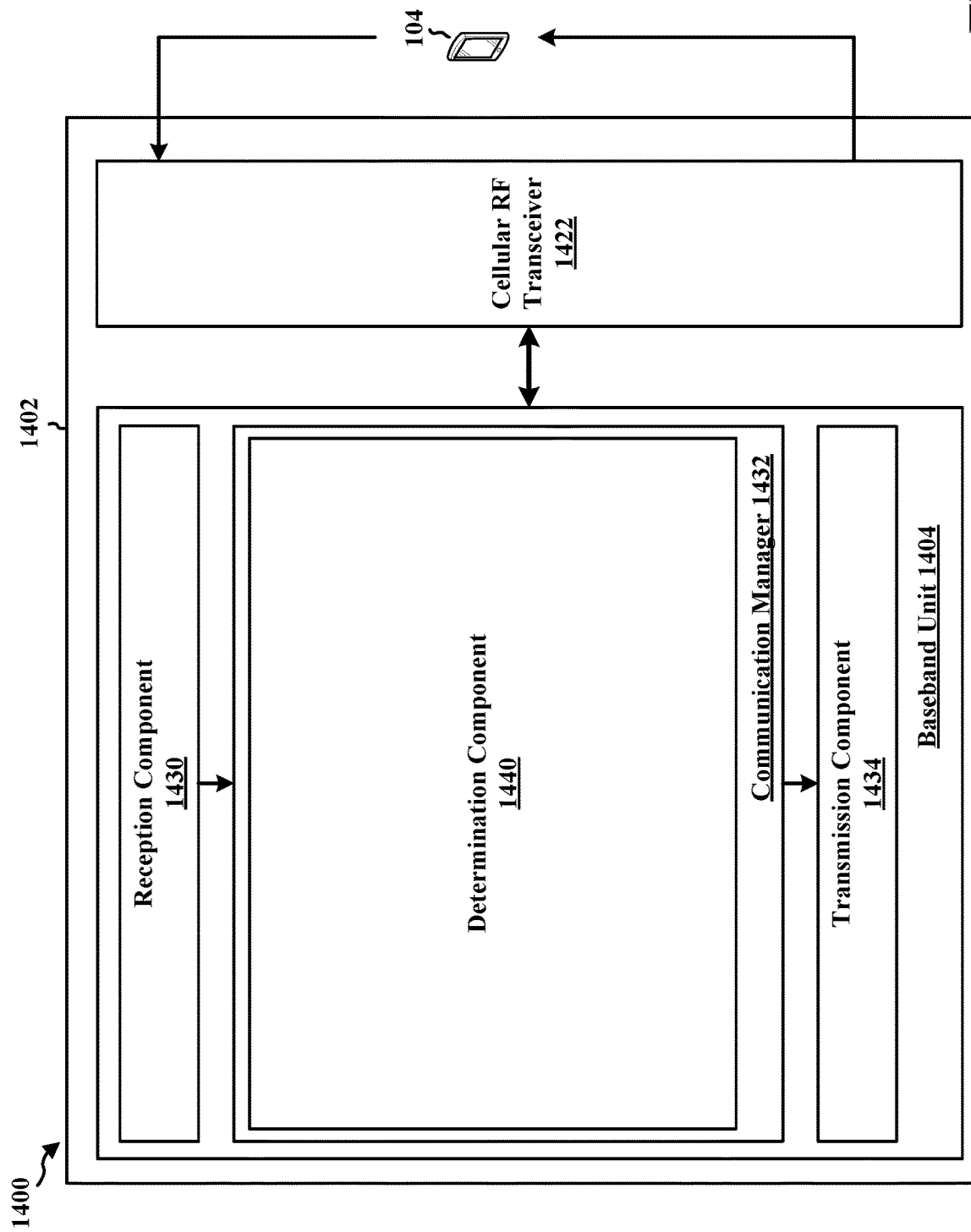
FIG. 14 is a diagram illustrating an example of a hardware implementation for an example apparatus.

FIG. 14 is a diagram 1400 illustrating an example of a hardware implementation for an apparatus 1402. The apparatus 1402 may be a base station, a component of a base station, or may implement base station functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a determination component 1440 that is configured to receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID), e.g., as described in connection with step 1202 above. Determination component 1440 may also be configured to select, based on the trace session activation request, at least one user equipment (UE) for data collection based on an availability of an MDT SNPN list information element (IE) at the at least one UE, e.g., as described in connection with step 1204 above. Determination component 1440 may also be configured to transmit, to the at least one UE, a logged measurement configuration including a PLMN ID and the NID, the logged measurement configuration further including at least one of the trace reference, a logging area, the MDT PLMN list, or an MDT NPN list, e.g., as described in connection with step 1206 above. Determination component 1440 may also be configured to receive, from the at least one UE, an availability indicator if the PLMN ID and the NID correspond to the MDT SNPN list, e.g., as described in connection with step 1208 above. Determination component 1440 may also be configured to collect, from one or more UEs, mobility history information (MHI) including an NID for the MHI, e.g., as described in connection with step 1210 above.

The apparatus may include additional components that perform each of the blocks of the algorithm in the flowcharts of FIGS. 8, 11, and 12. As such, each block in the flowcharts of FIGS. 8, 11, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for receiving, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID); means for selecting, based on the trace session activation request, at least one user equipment (UE) for data collection based on an availability of an MDT SNPN list information element (IE) at the at least one UE; means for transmitting, to the at least one UE, a logged measurement configuration including a PLMN ID and the NID, the logged measurement configuration further including at least one of the trace reference, a logging area, the MDT PLMN list, or an MDT NPN list; means for receiving, from the at least one UE, an availability indicator if the PLMN ID and the NID correspond to the MDT SNPN list; and means for collecting, from one or more UEs, mobility history information (MHI) including an NID for the MHI. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list; store the PLMN ID and the NID based on the received logged measurement configuration; compare the PLMN ID and the NID to an MDT standalone NPN (SNPN) list to identify if the PLMN ID and the NID are included in the MDT SNPN list; and transmit, to the base station, an availability indicator if the PLMN ID and the NID are included in the MDT SNPN list.

Aspect 2 is the apparatus of aspect 1, where the NID is included in the trace reference based on an identification of a trace collection entity (TCE) for an SNPN.

Aspect 3 is the apparatus of any of aspects 1 and 2, where the TCE for the SNPN is associated with a configured mapping that is unique to the SNPN.

Aspect 4 is the apparatus of any of aspects 1 to 3, where a logging duration starts when the logged measurement configuration is received by the UE, and where the logging duration is independent of registered SNPN changes or switching between closed access group (CAG) cells and non-CAG cells.

Aspect 5 is the apparatus of any of aspects 1 to 4, where the UE is selected for data collection based on an availability of an MDT SNPN list information element (IE) at the UE.

Aspect 6 is the apparatus of any of aspects 1 to 5, where the data collection is associated with one or more MDT reports or one or more self-organizing network (SON) reports.

Aspect 7 is the apparatus of any of aspects 1 to 6, where, if the logging area is not configured, one or more logged MDT measurements are performed if a registered SNPN is part of the MDT SNPN list.

Aspect 8 is the apparatus of any of aspects 1 to 7, where the availability indicator is a PLMN MDT availability indicator associated with PLMN MDT data or a PLMN SON availability indicator associated with PLMN SON data.

Aspect 9 is the apparatus of any of aspects 1 to 8, where the UE supports cross-system MDT reporting or cross-system self-organizing network (SON) reporting.

Aspect 10 is the apparatus of any of aspects 1 to 9, further including a transceiver coupled to the at least one processor, where the at least one processor is further configured to: collect, from one or more UEs, mobility history information (MHI) including an NID for the MHI.

Aspect 11 is the apparatus of any of aspects 1 to 10, where the availability indicator includes the MHI including the NID for the MHI.

Aspect 12 is the apparatus of any of aspects 1 to 11, where PLMN MDT data is processed in parallel with NPN MDT data, or where one or more PLMN MDT reports are processed in parallel with one or more NPN MDT reports.

Aspect 13 is the apparatus of any of aspects 1 to 12, where a connection establishment failure (CEF) report is stored upon reception of a radio resource control (RRC) rejection message.

Aspect 14 is the apparatus of any of aspects 1 to 13, where the NID is included in at least one of: a handover report, a failure indication, a resource status request, or a resource status update.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication at a base station including at least one processor coupled to a memory and configured to: receive, from a network entity, a trace session activation request including a network identifier (NID), the trace session activation request corresponding to at least one of a minimization of drive tests (MDT) standalone non-public network (SNPN) list, an MDT public land mobile network (PLMN) list, an SNPN target, a PLMN target, a trace reference, an area scope, a logging duration, or a trace collection entity identifier (ID); select, based on the trace session activation request, at least one user equipment (UE) for data collection based on an availability of an MDT SNPN list information element (IE) at the at least one UE; and transmit, to the at least one UE, a logged measurement configuration including a PLMN ID and the NID, the logged measurement configuration further including at least one of the trace reference, a logging area, the MDT PLMN list, or an MDT NPN list.

Aspect 19 is the apparatus of aspect 18, where the NID is included in the trace reference based on an identification of a trace collection entity (TCE) for an SNPN.

Aspect 20 is the apparatus of any of aspects 18 and 19, where the TCE for the SNPN is associated with a configured mapping that is unique to the SNPN.

Aspect 21 is the apparatus of any of aspects 18 to 20, where the logging duration starts when the logged measurement configuration is received by the at least one UE, and where the logging duration is independent of registered SNPN changes or switching between closed access group (CAG) cells and non-CAG cells.

Aspect 22 is the apparatus of any of aspects 18 to 21, where the at least one processor is further configured to: receive, from the at least one UE, an availability indicator if the PLMN ID and the NID correspond to the MDT SNPN list.

Aspect 23 is the apparatus of any of aspects 18 to 22, where the availability indicator is a PLMN MDT availability indicator associated with PLMN MDT data or a PLMN SON availability indicator associated with PLMN SON data.

Aspect 24 is the apparatus of any of aspects 18 to 23, where, if the logging area is not configured, one or more logged MDT measurements are performed if a registered SNPN is part of the MDT SNPN list.

Aspect 25 is the apparatus of any of aspects 18 to 24, where the at least one UE supports cross-system MDT reporting or cross-system self-organizing network (SON) reporting.

Aspect 26 is the apparatus of any of aspects 18 to 25, further including a transceiver coupled to the at least one processor, where the at least one processor is further configured to: collect, from one or more UEs, mobility history information (MHI) including an NID for the MHI.

Aspect 27 is the apparatus of any of aspects 18 to 26, where an availability indicator from the at least one UE includes the MHI including the NID for the MHI.

Aspect 28 is the apparatus of any of aspects 18 to 27, where the data collection is associated with one or more MDT reports or one or more self-organizing network (SON) reports.

Aspect 29 is the apparatus of any of aspects 18 to 28, where PLMN MDT data is processed in parallel with NPN MDT data, or where one or more PLMN MDT reports are processed in parallel with one or more NPN MDT reports.

Aspect 30 is the apparatus of any of aspects 18 to 29, where a connection establishment failure (CEF) report is based on a reception of a radio resource control (RRC) rejection message.

Aspect 31 is the apparatus of any of aspects 18 to 30, where the NID is included in at least one of: a handover report, a failure indication, a resource status request, or a resource status update.

Aspect 32 is a method of wireless communication for implementing any of aspects 18 to 31.

Aspect 33 is an apparatus for wireless communication including means for implementing any of aspects 18 to 31.

Aspect 34 is a computer-readable medium storing computer executable code, where the code when executed by a processor causes the processor to implement any of aspects 18 to 31.

What is claimed is:

1. An apparatus for wireless communication, comprising:
a memory; and
at least one processor coupled to the memory, wherein the at least one processor is configured to:
receive, via a transceiver, a logged measurement configuration from a base station, the logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list;
store the PLMN ID and the NID based on the received logged measurement configuration;
compare the PLMN ID and the NID to an MDT standalone NPN (SNPN) list to identify if the PLMN ID and the NID are included in the MDT SNPN list; and
transmit, via the transceiver, an availability indicator to the base station if the PLMN ID and the NID are included in the MDT SNPN list.

2. The apparatus of claim 1, wherein the NID is included in the trace reference based on an identification of a trace collection entity (TCE) for an SNPN.

3. The apparatus of claim 2, wherein the TCE for the SNPN is associated with a configured mapping that is unique to the SNPN.

4. The apparatus of claim 1, wherein a logging duration starts when the logged measurement configuration is received by the apparatus, and wherein the logging duration is independent of registered SNPN changes or switching between closed access group (CAG) cells and non-CAG cells.

5. The apparatus of claim 1, wherein the at least one processor is further configured to:
receive, via the transceiver, an indication to perform data collection based on an availability of an MDT SNPN list information element (IE) at the apparatus.

6. The apparatus of claim 5, wherein the data collection is associated with one or more MDT reports or one or more self-organizing network (SON) reports.

7. The apparatus of claim 1, wherein, if the logging area is not configured, and the at least one processor is configured to perform one or more logged MDT measurements for a registered SNPN based on the registered SNPN is part of the MDT SNPN list.

8. The apparatus of claim 1, wherein the availability indicator is a PLMN MDT availability indicator associated with PLMN MDT data or a PLMN SON availability indicator associated with PLMN SON data.

9. The apparatus of claim 1, wherein the apparatus supports cross-system MDT reporting or cross-system self-organizing network (SON) reporting.

10. The apparatus of claim 1, wherein the at least one processor is further configured to:
collect and store mobility history information (MHI) including the NID for the MHI.

11. The apparatus of claim 10, wherein the MHI includes the NID for standalone NPN (SNPN) in which the MHI is collected.

12. The apparatus of claim 1, wherein the at least one processor is configured to:
process PLMN MDT data in parallel with NPN MDT data, or
process one or more PLMN MDT reports in parallel with one or more NPN MDT reports.

13. The apparatus of claim 1, wherein the at least one processor is configured to store, at the apparatus upon reception of a radio resource control (RRC) rejection message, a report associated with a failed connection establishment or failed connection resume.

14. The apparatus of claim 1, wherein the NID is included in at least one of: a handover report, a failure indication, a resource status request, or a resource status update.

15. A method of wireless communication performed by an apparatus, comprising:
  receiving, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list;
  storing the PLMN ID and the NID based on the received logged measurement configuration;
  identifying that the PLMN ID and the NID are included in an MDT standalone NPN (SNPN) list; and
  transmitting, to the base station, an availability indicator based on the PLMN ID and the NID being included in the MDT SNPN list.

16. The method of claim 15, wherein the NID is included in the trace reference based on an identification of a trace collection entity (TCE) for an SNPN.

17. The method of claim 16, wherein the TCE for the SNPN is associated with a configured mapping that is unique to the SNPN.

18. The method of claim 15, wherein a logging duration starts when the logged measurement configuration is received by the apparatus, and wherein the logging duration is independent of registered SNPN changes or switching between closed access group (CAG) cells and non-CAG cells.

19. The method of claim 15, further comprising receiving an indication to perform data collection based on an availability of an MDT SNPN list information element (IE) at the apparatus.

20. The method of claim 19, wherein the data collection is associated with one or more MDT reports or one or more self-organizing network (SON) reports.

21. The method of claim 15, wherein the logging area is not configured, and one or more logged MDT measurements are performed for a registered SNPN based on the registered SNPN being in the MDT SNPN list.

22. The method of claim 15, wherein the availability indicator is a PLMN MDT availability indicator associated with PLMN MDT data or a PLMN SON availability indicator associated with PLMN SON data.

23. The method of claim 15, wherein the apparatus supports cross-system MDT reporting or cross-system self-organizing network (SON) reporting.

24. The method of claim 15, further comprising:
  collecting and storing mobility history information (MHI) including the NID for the MHI.

25. The method of claim 24, the MHI includes the NID for standalone NPN (SNPN) in which the MHI is collected.

26. The method of claim 15, further comprising:
  processing PLMN MDT data in parallel with NPN MDT data, or
  processing one or more PLMN MDT reports in parallel with one or more NPN MDT reports.

27. The method of claim 15, further comprising storing, upon reception of a radio resource control (RRC) rejection message, a report associated with a failed connection establishment or failed connection resume.

28. The method of claim 15, wherein the NID is included in at least one of: a handover report, a failure indication, a resource status request, or a resource status update.

29. An apparatus for wireless communication, comprising:
  means for receiving, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list;
  means for storing the PLMN ID and the NID based on the received logged measurement configuration;
  means for comparing the PLMN ID and the NID to an MDT standalone NPN (SNPN) list to determine if the PLMN ID and the NID are included in the MDT SNPN list; and
  means for transmitting, to the base station, an availability indicator if the PLMN ID and the NID are included in the MDT SNPN list.

30. A non-transitory computer-readable medium having code stored thereon that, when executed by an apparatus, causes the apparatus to:
  receive, from a base station, a logged measurement configuration including a public land mobile network (PLMN) identifier (ID) and a network identifier (NID), the logged measurement configuration further including at least one of a trace reference, a logging area, a minimization of drive tests (MDT) PLMN list, or a MDT non-public network (NPN) list;
  store the PLMN ID and the NID based on the received logged measurement configuration;
  identify that the PLMN ID and the NID are included in an MDT standalone NPN (SNPN) list; and
  transmit, to the base station, an availability indicator based on the PLMN ID and the NID being included in the MDT SNPN list.

* * * * *